(12) United States Patent
Shin et al.

(10) Patent No.: US 8,259,077 B2
(45) Date of Patent: Sep. 4, 2012

(54) ELECTRONIC DEVICE FOR INPUTTING USER COMMAND 3-DIMENSIONALLY AND METHOD FOR EMPLOYING THE SAME

(75) Inventors: Chang-beom Shin, Seoul (KR); Se-hyun Park, Seoul (KR); Ji-hyeon Kweon, Goyang-si (KR); Jae-won Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 983 days.

(21) Appl. No.: 11/443,181

(22) Filed: May 31, 2006

(65) Prior Publication Data

US 2006/0279554 A1 Dec. 14, 2006

Related U.S. Application Data

(60) Provisional application No. 60/686,458, filed on Jun. 2, 2005, provisional application No. 60/693,508, filed on Jun. 24, 2005.

(30) Foreign Application Priority Data

| Jul. 26, 2005 | (KR) | 10-2005-0068098 |
| Jul. 26, 2005 | (KR) | 10-2005-0068099 |
| Jul. 26, 2005 | (KR) | 10-2005-0068100 |
| May 15, 2006 | (KR) | 10-2006-0043347 |

(51) Int. Cl.
 *G06F 3/041* (2006.01)
(52) U.S. Cl. ........................ 345/173; 345/157; 178/18.01
(58) Field of Classification Search ................. 345/157, 345/173–178; 178/18.01–20.04
See application file for complete search history.

(56) References Cited

U.S. PATENT DOCUMENTS

| 5,335,557 | A | * | 8/1994 | Yasutake | 73/862.043 |
| 5,880,411 | A | * | 3/1999 | Gillespie et al. | 178/18.01 |
| 5,995,083 | A | | 11/1999 | Sato et al. | |
| 6,028,271 | A | * | 2/2000 | Gillespie et al. | 178/18.01 |
| 6,157,383 | A | | 12/2000 | Loop | |
| 6,414,671 | B1 | * | 7/2002 | Gillespie et al. | 345/157 |
| 6,597,347 | B1 | * | 7/2003 | Yasutake | 345/173 |
| 6,610,936 | B2 | * | 8/2003 | Gillespie et al. | 178/18.01 |
| 6,720,956 | B1 | * | 4/2004 | Honma et al. | 345/174 |
| 6,724,366 | B2 | * | 4/2004 | Crawford | 345/157 |

(Continued)

FOREIGN PATENT DOCUMENTS

JP 61-248121 11/1986

(Continued)

OTHER PUBLICATIONS

Vorisky, "Informatika, Novy Sistematizirovanny Slovar-Spravochnik", Moscow, Fizmatlit, p:224, 2003.

*Primary Examiner* — Amare Mengistu
*Assistant Examiner* — Dmitriy Bolotin
(74) *Attorney, Agent, or Firm* — Roylance, Abrams, Berdo & Goodman, L.L.P.

(57) ABSTRACT

An electronic device for 3-dimensionally inputting a user command and a method employing the same are provided. The electronic device includes a touch pad sensing a 3-dimensional interface and a controller controlling a GUI (graphical user interface) in response to the 3-dimensional interface sensed by the touch pad. Thus, a user command can be 3-dimensionally input so as to harmonize a 3-dimensional varying method of a 3-dimensional GUI with a 3-dimensional input manipulation of a user.

50 Claims, 38 Drawing Sheets

U.S. PATENT DOCUMENTS

| | | |
|---|---|---|
| 7,183,948 B2 * | 2/2007 | Roberts .................. 341/34 |
| 2001/0035880 A1 | 11/2001 | Musatov et al. |
| 2002/0093491 A1 * | 7/2002 | Gillespie et al. ............. 345/173 |
| 2003/0001898 A1 | 1/2003 | Bernhardson |
| 2003/0076306 A1 | 4/2003 | Zadesky et al. |
| 2011/0109586 A1 * | 5/2011 | Rip et al. .................. 345/174 |
| 2011/0109587 A1 * | 5/2011 | Ferencz et al. ............. 345/174 |

FOREIGN PATENT DOCUMENTS

| | | |
|---|---|---|
| JP | 09-097154 | 4/1997 |
| JP | 10-133818 | 5/1998 |
| JP | 10-149254 | 6/1998 |
| JP | 2001-142634 | 5/2001 |
| JP | 2002-351603 | 12/2002 |
| JP | 2003-263256 | 9/2003 |
| JP | 2003-312373 | 11/2003 |
| JP | 2004-166109 | 6/2004 |
| JP | 2005-502965 | 1/2005 |
| KR | 10-2004-0048942 | 6/2002 |
| RU | 2242043 C2 | 12/2004 |
| WO | WO 2003/104965 | 12/2003 |
| WO | WO 2005/019987 | 3/2005 |

* cited by examiner

FIG. 4A  FIG. 4B  FIG. 4C
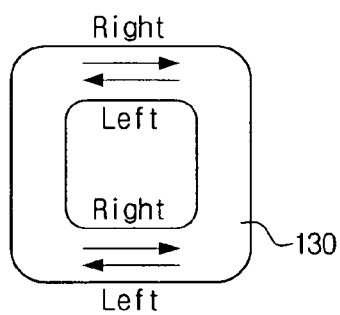
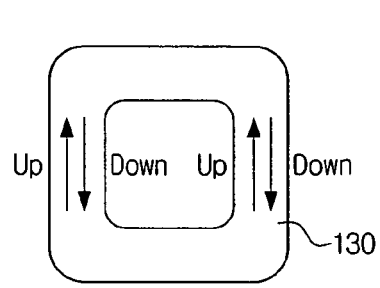
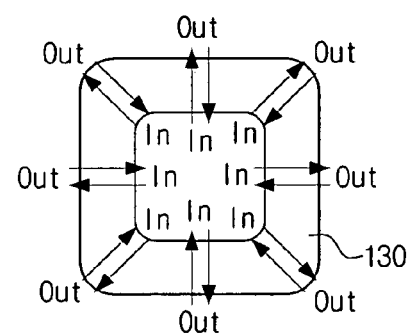
FIG. 5A  FIG. 5B
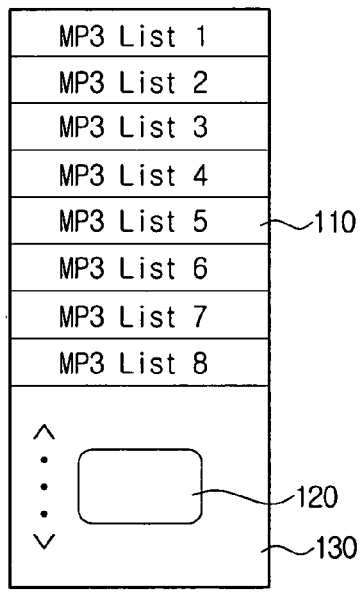
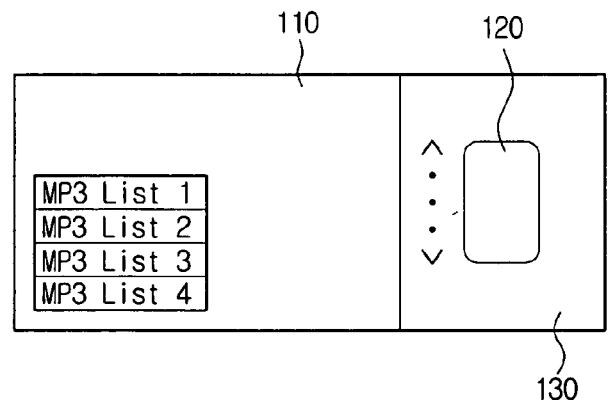

FIG. 26A

| | |
|---|---|
| | ◁  ePlaylist:ALL  ▷ |
| ♫ | 01.Affirmation-Savage Garden |
| ♫ | 02.Let's Get Ret-Black Eyed Peas |
| ♫ | 03.Hold me-Savage Garden |
| ♫ | 04.Hollaback Girl -Gwen Stefani |
| ♫ | 05.Don't Phunk With My Heart-Black Eyed Peas |
| ♫ | 06.Behind These Hazel Eyes-Kelly Clakson |
| ♫ | 07.Mr Briabtside-The Killers |

FIG. 26B

| | |
|---|---|
| ♫ | 13.Beverly Hills-Weezer |
| ♫ | 01.Affirmation-Savage Garden |
| ▶ | Out Of Reach        00:30:02 32/146 ◯ SRS |
| ♫ | 03.Hold me-Savage Garden |
| ♫ | 04.Hollaback Girl -Gwen Stefani |
| ♫ | 05.Don't Phunk With My Heart-Black Eyed Peas |

FIG. 26C

| | |
|---|---|
| | ◁  ePlaylist:ALL  ▷ |
| ▶ | Out Of Reach        00:30:00 32/146 ◯ SRS |
| ♫ | 03.Hold me-Savage Garden |
| ♫ | 04.Hollaback Girl -Gwen Stefani |
| ♫ | 05.Don't Phunk With My Heart-Black Eyed Peas |
| ♫ | 06.Behind These Hazel Eyes-Kelly Clakson |
| ♫ | 07.Mr Briabtside-The Killers |

FIG. 27A

□ 2 Album
- ⦿ Will Smith
- ♪ I Believe I Can Fly  ▽
- ♪ No Suprise
- ♪ Tell Laura I Love Her

FIG. 27B

□ 2 A🅐🅑🅐 Album
- ⦿ ill Smith  LE
- ♪ elieve I Can Fly ▽  Fl
- ♪ Suprise  St
- ♪ Laura I Love Her  Hi

FIG. 27C

□ 2 A□n🅐 Album
- ⦿ LEE SEUNG HWAN
- ♪ Flower  ▽
- ♪ Stay or leave
- ♪ Highway star

FIG. 27D

□ 3 Album
- ⦿ LEE SEUNG HWAN
- ♪ Flower  ▽
- ♪ Stay or leave
- ♪ Highway star

ELECTRONIC DEVICE FOR INPUTTING USER COMMAND 3-DIMENSIONALLY AND METHOD FOR EMPLOYING THE SAME

CROSS-REFERENCE TO RELATED APPLICATIONS

This application claims the benefit of priority under 35 U.S.C. §119(a) from Korean Patent Application No. 10-2005-68098 filed on Jul. 26, 2005, Korean Patent Application No. 10-2005-68100 filed on Jul. 26, 2005, Korean Patent Application No. 10-2005-68099 filed on Jul. 26, 2005 and Korean Patent Application No. 10-2006-043347 filed on May 15, 2006 in the Korean Intellectual Property Office, and claims the benefit under 35 U.S.C. 119(e) from U.S. Provisional Patent Application No. 60/686,458 filed on Jun. 2, 2005, and U.S. Provisional Patent Application No. 60/693,508 filed on Jun. 24, 2005 in the United States Patent and Trademark Office, the entire disclosures of all of which is hereby incorporated by reference.

BACKGROUND OF THE INVENTION

1. Field of the Invention

The present invention relates to an electronic device. More particularly, the present invention relates to an electronic device for inputting a user command 3-dimensionally.

2. Description of the Related Art

A user interface (UI) is generally referred to as a mechanism through which an electronic device and a user can interact. In other words, the UI is a mechanism through which the user can transmit a command to the electronic device. A physical user interface (PUI) and a graphical user interface (GUI) are representative examples of the UI.

The PUI refers to a mechanism through which a user command is input in a physical method using a keyboard, a manipulation button, or the like, and the GUI refers to a member through which an icon or a menu displayed on a display is selected to input a user command.

Even when the user command is input using the GUI, the PUI is still required. This is because movement and selection commands are input through only the PUI in the GUI through which the user moves a pointer (cursor) with reference to a menu, a list, an icon, or the like displayed on a display and selects an item on which the pointer is positioned.

3-dimensional GUIs have been developed to provide the convenience of manipulations of electronic devices and high visual effects to users and are commonly used in games and the like.

Unfortunately, as described above, although a GUI provided to a user can be 3-dimensionalized, the input manipulation of the user through a PUI remains 2-dimensionally performed.

Accordingly, there is a need for an improved device which allows for user input in 3-dimensions.

SUMMARY OF THE INVENTION

Exemplary embodiments of the present invention address at least the above problems and/or disadvantages and provide at least the advantages described below. Accordingly, an aspect of the present invention is to provide an electronic device for inputting a user command 3-dimensionally and harmonizing a 3-dimensional varying method of a 3-dimensinal GUI with a 3-dimensional input manipulation of a user.

According to an exemplary aspect of the present invention, there is provided an electronic device comprising a touch pad sensing a 3-dimensional interface and a controller controlling a GUI (graphical user interface) in response to the 3-dimensional interface sensed by the touch pad.

The exemplary touch pad may sense interfaces on a first, a second, and a third axis input by a user, and the exemplary controller may decipher the interfaces on the first, second, and third axes sensed by the touch pad as a first, a second, and a third user commands, respectively, and control the GUI based on the deciphered results.

The first user command may be a user command related to a fourth axis direction on a GUI picture, the second user command may be a user command related to a fifth axis direction on the GUI picture, and the third user command may be a user command related to a sixth axis direction on the GUI picture.

The interface on the first axis may be sensed in one of upper and lower areas of the touch pad, the interface on the second axis may be sensed in one of left and right areas of the touch pad, and the interface on the third axis may be sensed in one of the upper, lower, left, and right areas of the touch pad.

The exemplary touch pad may comprise outer and inner parts forming a slope.

The exemplary touch pad may have a ring shape, a circular shape, a square ring shape, a square shape, a C shape, an L shape or the like.

The exemplary touch pad senses a point touched by the user, and the controller deciphers a type of a user command based on the touched point sensed by the touch pad.

The exemplary electronic device may comprise a touchable point displaying information as to a user command input through a touch of the touchable point.

The exemplary electronic device may comprise a touchable point displaying information as to a user command input through a touch of the touchable point around the touchable point.

The exemplary electronic device may further comprise a main display positioned outside the touch pad and displaying information as to a user command input through a touch of a touchable point.

A position of the information as to the user command on the main display may visually correspond to a position of a touchable point on the touch pad touched to input the user command.

The exemplary electronic device may further comprise an auxiliary display displaying information as to a user command.

The information as to the user command may be displayed at a point on the auxiliary display adjacent to a point on a touch pad touched to input the user command.

The exemplary electronic device may further comprise a manipulation button positioned inside the touch pad and sensing an input of a user. The exemplary controller may decipher the input of the user sensed by the manipulation button as a user command.

The exemplary manipulation button may comprise at least one button sensing pressing performed by a user.

The exemplary electronic device may further comprise an auxiliary display positioned inside the touch pad, displaying information as to a user command that can be input, and inputting a user command displayed through a touch.

The exemplary electronic device may further comprise an emitter comprising at least one light emitting device provided in the touch pad.

The exemplary controller may control the light emitting device to emit light corresponding to a 3-dimensional interface sensed by the touch pad.

The exemplary touch pad may sense interfaces in a first, a second, and a third direction input by a user, and the exemplary controller may control the light emitting device to emit light so that the light moves along the first, second, and third directions of the interfaces sensed by the touch pad.

The exemplary touch pad may sense interfaces on first, second, and third axes input by a user, and the exemplary controller controls the light emitting device to vary a brightness of light in response to the interfaces on the first, second, and third axes sensed by the touch pad.

The exemplary touch pad may sense a point touched by a user, and the exemplary controller may control the light emitting device to emit light at a minimum of one of the touched points sensed by the touch pad and around the touched point.

The exemplary controller may control the exemplary light emitting device to vary a light emission degree with a strength of a touch of the user.

The exemplary controller may control the exemplary light emitting device to emit light corresponding to an operation state of the electronic device The exemplary light emitting device may display information indicating areas in which a user is able to input interfaces on a first, a second, and a third axes, in each of the areas.

The exemplary electronic device may further include a main display positioned outside the touch pad and displaying information as to a user command input through a touch of a touchable point. A color of the information as to the user command displayed on the main display may be equal to a color of a touchable point displayed by the exemplary light emitting device.

The exemplary controller may control a size of an image to be displayed to vary the size of the image in response to the 3-dimensional interface sensed by the touch pad.

The exemplary controller may control a number of images to be displayed to vary the number of images in response to the 3-dimensional interface sensed by the touch pad.

If a plurality of windows performing different tasks may be disposed in a multilayer structure, the exemplary controller may control a window to move to another layer so as to display the window on the another layer in response to the 3-dimensional interface sensed by the touch pad.

The exemplary controller may control an upper menu or a lower menu of a menu item to display the upper or lower menu in response to the 3-dimensional interface sensed by the touch pad.

The exemplary controller may control an execution picture of a menu item indicated by a pointer to display the execution picture inside the pointer in response to the 3-dimensional interface sensed by the touch pad.

According to another exemplary aspect of the present invention, there is provided an UI (user interface) method comprising sensing a 3-dimensional interface and controlling a GUI in response to the sensed 3-dimensional interface.

Interfaces on a first, a second, and a third axes input by a user may be sensed, the interfaces on the first, second, and third axes may be respectively deciphered as first, second, and third user commands, and the GUI may be controlled based on the deciphered results.

The first user command may be a user command related to a fourth axis direction on a GUI picture, the second user command may be a user command related to a fifth axis direction on the GUI picture, and the third user command may be a user command related to a sixth axis direction on the GUI picture.

According to another exemplary aspect of the present invention, there is provided an electronic device comprising an input unit sensing at least one of interfaces in first, second, and third directions and a controller controlling a GUI in response to the interfaces sensed by the input unit.

According to another exemplary aspect of the present invention, there is provided an UI method comprising sensing at least one of interfaces in first, second, and third directions and controlling a GUI in response to the sensed interfaces.

According to another exemplary aspect of the present invention, there is provided an electronic device comprising an input unit sensing a 3-dimensional interface and a controller controlling contents displayed on a display in response to the 3-dimensional interface sensed by the input unit.

According to another exemplary aspect of the present invention, there is provided an UI method comprising sensing a 3-dimensional interface and controlling displayed contents in response to the sensed 3-dimensional interface.

According to another exemplary aspect of the present invention, there is provided an input unit comprising a touch pad sensing a 3-dimensional interface input by a user. The 3-dimensional interface sensed by the touch pad may be transmitted to a device controlling an electronic device.

According to another exemplary aspect of the present invention, there is provided an electronic device comprising an input unit sensing interfaces in first and second directions and a controller controlling contents displayed on a display in response to the interfaces sensed by the input unit.

According to another exemplary aspect of the present invention, there is provided an electronic device comprising an input unit sensing an interface input by a user and a controller deciphering a type of a user command in response to the interface sensed by the input unit.

According to another exemplary aspect of the present invention, there is provided an electronic device comprising an input unit comprising at least two areas sensing an interface input by a user. A type of the interface sensed by the at least two areas of the input unit may be determined depending on a direction along which an image is displayed on a display.

BRIEF DESCRIPTION OF THE DRAWINGS

The above and other objects, features, and advantages of certain embodiments of the present invention will be more apparent from the following description taken in conjunction with the accompanying drawings, in which:

FIGS. 4A through 4C and FIGS. 5A and 5B are views illustrating an area on a 3-dimensional touch pad that may be rubbed;

FIGS. 25 through 43 are views illustrating exemplary methods of sensing and deciphering 3-dimensional rubbings of a user to generate and/or display 3-dimensional GUIs matching with user commands.

Throughout the drawings, the same drawing reference numerals will be understood to refer to the same elements, features, and structures.

DETAILED DESCRIPTION OF EXEMPLARY EMBODIMENTS

Exemplary embodiments of the present invention will now be described in detail with reference to the annexed drawings. In the following description, detailed descriptions of known functions and configurations incorporated herein have been omitted for conciseness and clarity.

Figure 1:
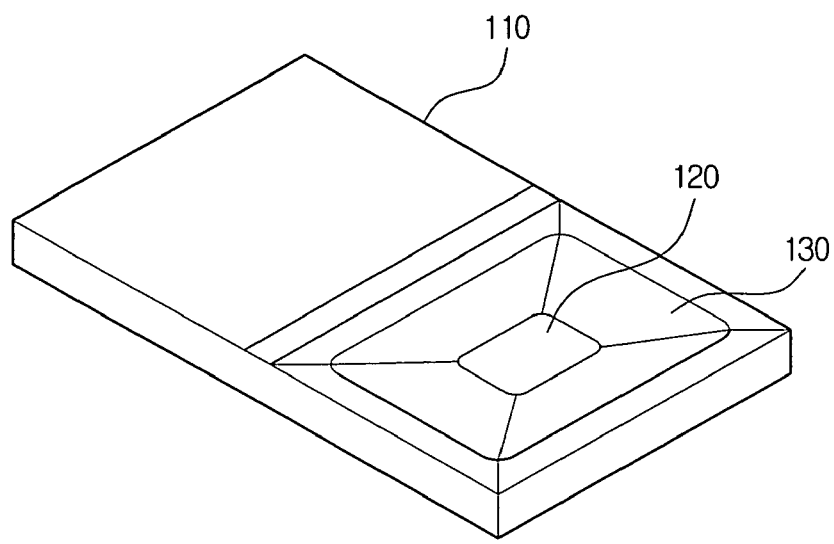
FIG. 1 is a perspective view of an external appearance of an electronic device for inputting a user command 3-dimensionally according to an exemplary embodiment of the present invention.

FIG. 1 is a perspective view of an external appearance of an electronic device for inputting a user command 3-dimensionally according to an exemplary embodiment of the present invention. As shown in FIG. 1, the electronic device includes a main LCD 110, a manipulation button 120, and a 3-dimensional touch pad 130.

The main LCD 110 is a display displaying contents such as images and texts and a 3-dimensional GUI.

The 3-dimensinal GUI is a GUI 3-dimensionally displayed and varying on a 3-dimensional space. In detail, the 3-dimensional GUI means a GUI through which a 3-dimentional GUI picture or content displayed on the 3-dimensional GUI picture moves along an X-axis, a Y-axis, a Z-axis or a combination axis of the X-axis, the Y-axis and the Z-axis or varies with its movement along the X-axis, the Y-axis, the Z-axis or the combination axis. The content displayed on the 3-dimensional GUI picture may be an icon, a menu, a list, a pointer (cursor), an image, and the like. Also, the variation with the movement of the contents displayed on the 3-dimensional GUI picture includes variations in sizes of the contents and variations in the contents.

The manipulation button 120 is a PUI through which a user can input a user command through a touch. The manipulation button 120 is mainly used to select or execute an item indicated by a pointer (cursor) displayed on the 3-dimensional GUI.

The 3-dimensional touch pad 130 is a PUI through which the user can 3-dimensionally input a user command with reference to the 3-dimensional GUI displayed on the main LCD 110. In other words, the 3-dimensional touch pad 130 is used to 3-dimensionally input the user command to 3-dimensionally vary the 3-dimensional GUI on the 3-dimensional space. In detail, the 3-dimensional touch pad 130 is used to input the user command to move the 3-dimentional GUI picture or the contents displayed on the 3-dimensional GUI picture along the X-axis, the Y-axis, the Z-axis or the combination axis of the X-axis, the Y-axis and the Z-axis or vary it with its movement of the X-axis, the Y-axis, the Z-axis, or the combination axis.

A shape of the 3-dimensional touch pad 130 will now be described in detail.

Figure 2A:
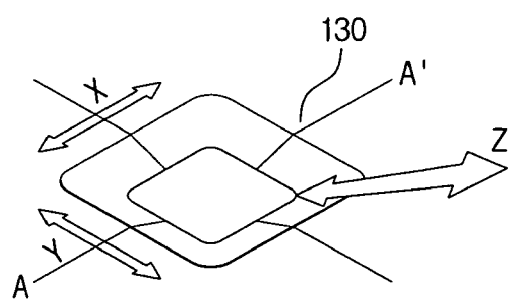
FIGS. 2A and 2B and 3A through 3C are views illustrating exemplary shapes of a 3-dimensional touch pad shown in FIG. 1.
Figure 2B:
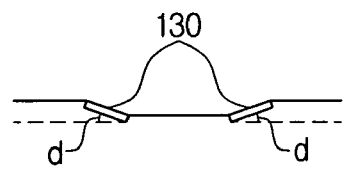

FIG. 2A illustrates only the 3-dimensional touch pad 130 shown in FIG. 1, and FIG. 2B is a cross-sectional view taken along line A-A' of FIG. 2A. As shown in FIGS. 2A and 2B, an external portion of the 3-dimensional touch pad 130 is higher than an internal portion of the 3-dimensionla touch pad 130. In other words, the 3-dimensional touch pad 130 has a slope descending at an angle d from the external portion toward the internal portion.

The angle d of the descending slope of the 3-dimensionla touch pad 130 may be arbitrarily determined in consideration of a thickness of an electronic device to be realized. In other words, if the electronic device is allowed to be thickened, the angle d of the descending slope may be great. If the electronic device is to be thinned, the angle d of the descending slope may be small. If the electronic device is to be very thinly manufactured, the angle d of the descending slope may be "0°," in other words the 3-dimensional touch pad 130 may be flatly realized.

Figure 3A:
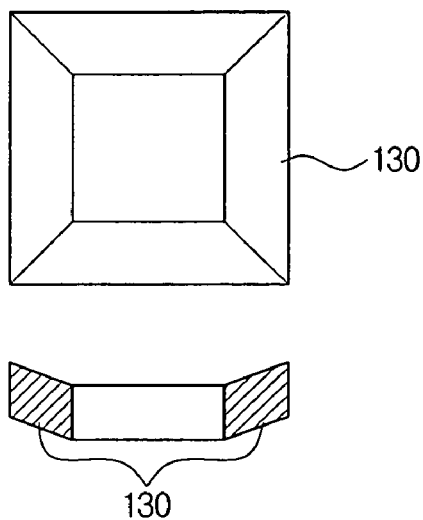
Figure 3B:
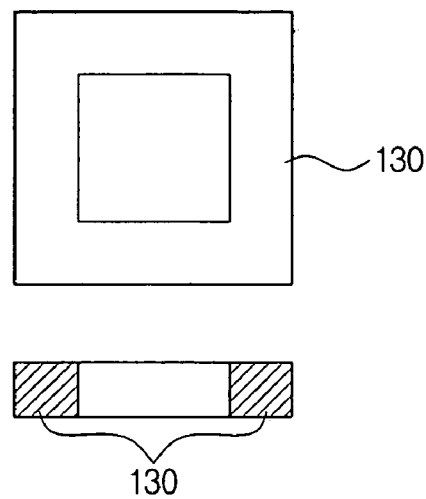

In other words, the 3-dimensional touch pad 130 may be realized in a concave shape as shown in FIG. 3A or may be realized in a flat shape as shown in FIG. 3B.

Figure 3C:
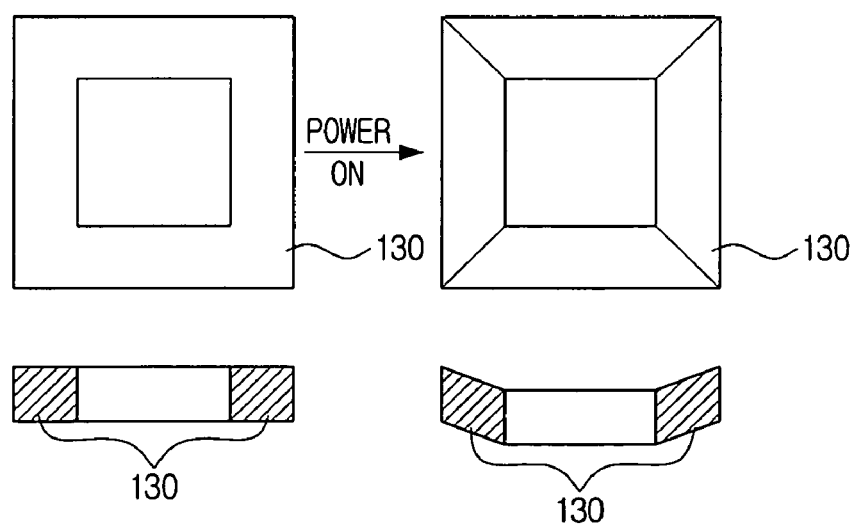

In addition, as shown in FIG. 3C, the 3-dimensional touch pad 130 may have a flat shape when an electronic device is powered off but may be modified into a concave shape when the electronic device is powered on.

The 3-dimensional touch pad 130 may be modified from a flat shape into a concave shape only when a user command can or is needed to be 3-dimensionally input. In this case, a user may intuitively perceive that the user command can or is needed to be 3-dimensionally input.

Although not shown in FIGS. 3A through 3C, the 3-dimensional touch pad 130 may be realized in a convex shape.

An exemplary method of 3-dimensionally inputting a user command from a user through the 3-dimensional touch pad 130 will now be described. 3-dimensionally inputting the user command means that the user 3-dimensionally rubs the 3-dimensional touch pad 130 to input the user command.

In detail, the user may rub the 3-dimensional touch pad 130 along three different axes, in other words along an X-axis, a Y-axis, or a Z-axis as shown in FIG. 2A. As shown in FIG. 2A, the Z-axis is not orthogonal to the X-axis and the Y-axis and thus may not be regarded as a Z-axis coinciding with a mathematical meaning but is referred to as a Z-axis for convenience in the present exemplary embodiment.

Rubbing on the X-axis includes rubbings in left and right directions on the 3-dimensional touch pad 130. The rubbing in the left direction denotes rubbing in a left direction in an upper or lower area of the 3-dimensional touch pad 130 as shown in FIG. 4A. Hereinafter, the rubbing in the left direction will be referred to as left-rubbing for convenience.

The rubbing in the right direction denotes rubbing in a right direction in the upper or lower area on the 3-dimensional touch pad 130 as shown in FIG. 4A. Hereinafter, the rubbing in the right direction will be referred to as right-rubbing for convenience.

Left-rubbing and/or right-rubbing are performed to input a user command to move a 3-dimensinal GUI picture or contents displayed on the 3-dimensional GUI picture to the left and/or right (on an X-axis) or vary it or them with its movement or their movements to the left and/or right.

Rubbing on the Y-axis includes rubbings in up and down directions on the 3-dimensional touch pad 130. The rubbing in the up direction denotes rubbing in an up direction in a left or right area on the 3-dimensional touch pad 130 as shown in FIG. 4B. Hereinafter, the rubbing in the up direction will be referred to as up-rubbing for convenience.

The rubbing in the down direction denotes rubbing in a down direction in the left or right area on the 3-dimensional touch pad 130 as shown in FIG. 4B. Hereinafter, the rubbing in the down direction will be referred to as down-rubbing for convenience.

Up-rubbing and/or down-rubbings are performed to input a user command to move a 3-dimensinal GUI picture or contents displayed on the 3-dimensional GUI picture up and/or down (on a Y-axis) or vary it or them with its movement or their movements up and/or down.

Rubbing on the Z-axis includes rubbings in inward and outward directions on the 3-dimensional touch pad 130.

The rubbing in the inward direction denotes rubbing in an inward direction on the 3-dimensional touch pad 130 as shown in FIG. 4C. Hereinafter, the rubbing in the inward direction will be referred to as in-rubbing.

The rubbing in the outward direction denotes rubbing in an outward direction on the 3-dimensional touch pad 130 as shown in FIG. 4C. Hereinafter, the rubbing in the outward direction will be referred to as out-rubbing.

As shown in FIG. 4C, positions of the 3-dimensional touch pad 130 in which in-rubbing and out-rubbing can be input are not limited. In other words, in-rubbing and out-rubbing may be input in any position of the 3-dimensional touch pad 130.

In other words, the in-rubbing and the out-rubbing may be input in the upper and lower areas on the 3-dimensional touch pad 130 in which left-rubbing and right-rubbing are input or in the left and right areas on the 3-dimensional touch pad 130 in which up-rubbing and down-rubbing are input. Although rubbings are input to an identical area on the 3-dimensional touch pad 130, the rubbings are input in different directions. Thus, the inputting of the rubbings in the identical area is acceptable and does not matter.

In addition, the in-rubbing and the out-rubbing may be input in a left upper area in which the left and right areas intersect, a left lower area in which the left and lower areas intersect, a right upper area in which the right and upper areas intersect, or a right lower area in which the right and lower areas intersect.

As described above, an exemplary 3-dimensional touch pad 130 has the concave shape in which the external portion is higher than the internal portion. Thus, in-rubbing from an outward direction toward an inward direction may be regarded as rubbing from a higher point toward a lower point on the 3-dimensional touch pad 130. Also, out-rubbing from an inward direction toward an outward direction may be regarded as rubbing from a lower point toward a higher point on the 3-dimensional touch pad 130.

Thus, when in-rubbing is input, a user feels a finger going inward or downward. When out-rubbing is input, the user feels the finger going outward or upward.

In-rubbing and/or out-rubbing are performed to input a user command to move a 3-dimensinal GUI picture or contents displayed on the 3-dimensional GUI picture inward and/or outward (on a Z-axis) or vary it or them with its movement or their movements inward and/or outward.

In detail, the in-rubbing is performed to input a user command for moving a menu indicated by a pointer (cursor) toward a lower menu of items, moving toward detailed information as to a list item of items of a list indicated by the pointer (cursor), zooming a displayed image and moving a window on a higher layer toward a lower layer in a case of a disposition of a plurality of windows performing tasks in a multilayer structure.

Also, a user command that may be input through out-rubbing is symmetric to a user command that may be input through in-rubbing. In other words, out-rubbing is performed to input a user command for moving from a lower menu toward an upper menu, moving from detailed information toward a list, zooming out a displayed image and moving a second highest layer to a highest layer in a case of a disposition of a plurality of windows performing tasks in a multilayer structure.

As shown in FIG. 4B, up-rubbing and/or down-rubbing may input in two areas, in other words the left and right areas on the 3-dimensional touch pad 130. Thus, a user may selectively use an area in which up-rubbing and/or down-rubbing can be conveniently input. In other words, a left-handed user may input up-rubbing and/or down-rubbing through the left area on the 3-dimensional touch pad 130, while a right-handed user may input up-rubbing and/or down-rubbing through the right area on the 3-dimensional touch pad 130. As a result, convenience of a user may be increased.

Types of rubbings that may be input through areas on the 3-dimensional touch pad 130 are not fixed but may vary. In detail, an area on the 3-dimensional touch pad 130 in which left-rubbing and/or right-rubbing may be input may be interchanged with an area on the 3-dimensional touch pad 130 in which up-rubbing and/or down-rubbing may be input.

In more detail, a case where a rubbing inputting area is changed with a use direction of an electronic device may be suggested. In other words, in a case where an electronic device is used in a lengthwise direction as shown in FIG. 5A, an area indicated by a bi-directional arrow is an area in which up-rubbing and/or down-rubbing may be input. In a case where the electronic device is used in a widthwise direction as shown in FIG. 5B, an area indicated by a bi-directional arrow is an area in which up-rubbing and/or down-rubbing may be input.

Accordingly, an area of the 3-dimentional touch pad 130 in which up-rubbing and/or down-rubbing can be input varies with a user direction of an electronic device. As a result, the convenience of a user can be increased.

In other words, although rubbings are input in an identical area, types of the rubbings may be different according to use directions of an electronic device. Here, the use directions of the electronic device may be directions along which an image is displayed on the main LCD 110.

The 3-dimensional touch pad 130 as a kind of PUI for 3-dimensionally inputting a user command has been described in detail. The 3-dimensional touch pad 130 may be understood as an input member sensing a 3-dimensional interface as a 3-dimensional inputs manipulation of a user. The 3-dimensional touch pad 130 may also be understood as an input member sensing interfaces on three axes input by a user. In addition, the 3-dimensional touch pad 130 may also be understood as an input member sensing interfaces in three directions input by a user.

Even in a case where the 3-dimensional touch pad 130 is realized in a flat shape, the user may input the interfaces in the three directions and the 3-dimensional touch pad 130 may sense the interfaces.

The 3-dimensional touch pad 130 emits light besides 3-dimensionaly receiving a user command. Light emitting of the 3-dimensional touch pad 130 will now be described in detail.

The 3-dimensional touch pad 130 may use such a light emitting function to display a rubbing guide in an area (hereinafter referred to as a rubbing-possible area) on the 3-dimensional touch pad 130 in which rubbing may be input, in relation to a 3-dimensional GUI currently displayed on the main LCD 100.

A rubbing guide is information that indicates a type or types of rubbing that may be input in a rubbing-possible area displaying the rubbing guide. Thus, a user can check a rubbing-possible area and a type of rubbing that may be input in the rubbing-possible area through a rubbing guide.

A main LCD 110 of an electronic device shown in FIG. 6A will now be described. A current user U may input only up-rubbing and/or down-rubbing performed to move a pointer (cursor) positioned on a menu item up and/or down. Thus, up and/or down bidirectional arrows are shown as a rubbing guide in a left area on a 3-dimensional touch pad 130.

Figure 6A:
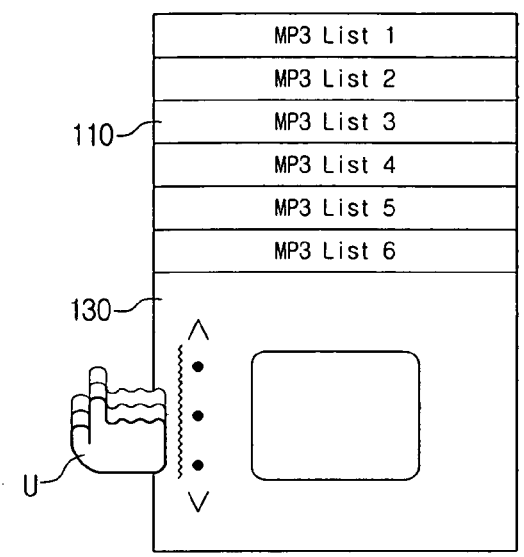
FIG. 6 is a view illustrating an exemplary rubbing guide.

The up and/or down bi-directional arrows as the rubbing guide are shown in the left area on the 3-dimensional touch pad 130 in FIG. 6A but are not limited to this. Thus, up and/or down bi-directional arrows as a rubbing guide may be shown in a right area on the 3-dimensional touch pad 130 that is another up and/or down-rubbing-possible area.

A main LCD 110 of an electronic device shown in FIG. 6B will now be described. A current user U may input up-rubbing and/or down-rubbing for moving a displayed map up and/or down, left-rubbing and/or right-rubbing for moving a displayed map to the left and/or right, or in-rubbing and/or out-rubbing for zooming in and/or out a displayed map.

Thus, up and/or down bidirectional arrows as a up-rubbing and/or down-rubbing guide are displayed in a left area on a 3-dimensional touch pad 130, left and/or right bidirectional arrows as a left-rubbing and/or right-rubbing guide are displayed in an upper area on the 3-dimensional touch pad 130, inward and/or outward bidirectional arrows as an in-rubbing and/or out-rubbing guide are displayed in a right lower area on the 3-dimensional touch pad 130.

Figure 6B:
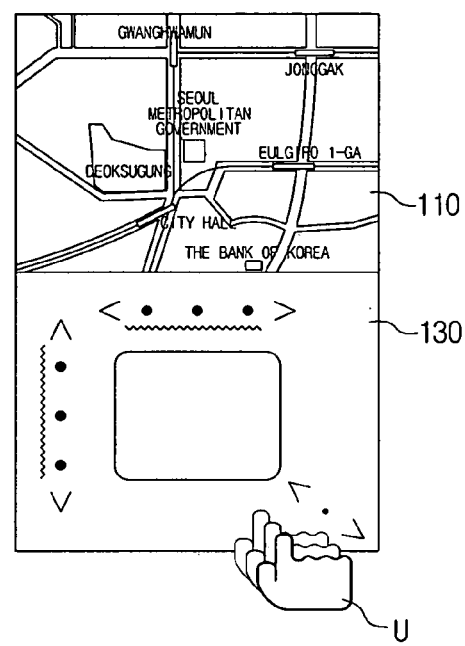

As shown in FIG. 6B, rubbing guides may be further displayed in other rubbing-possible areas in which rubbings may be input.

There have been described the 3-dimensional touch pad 130 for 3-dimensionally inputting a user command through 3-dimensional rubbing, a method of 3-dimensionally rubbing the 3-dimensional touch pad 130 to 3-dimensionally input a user command, and a method of displaying a rubbing guide in a rubbing-possible area using a light emitting function.

The 3-dimensional touch pad 130 may be touched by a user besides being 3-dimensionally rubbed by the user. This will be described below in detail.

The user may touch a specific point of the 3-dimensional touch pad 130 to input a specific user command. In other words, the 3-dimensional touch pad 130 includes a plurality of points (hereinafter referred to as touchable points) that may be touched to input user commands, and the user commands input through the touches of the user are differently designated in each touchable point.

Figure 7:
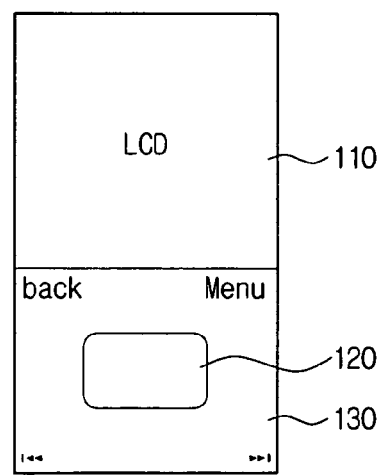
FIG. 7 is a view illustrating an exemplary 3-dimensional touch pad having a touchable point at which a user command-guide is visually displayed.

In an electronic device shown in FIG. 7, a 3-dimensional touch pad 130 includes four touchable points. Also, a guide (hereinafter referred to as a user command guide) to a user command input through a touch is visually displayed in each of the touchable points. Thus, a user may perceive the touchable points on the 3-dimensional touch pad 130 and types of user commands input through the touchable points. The user command guide may be displayed using various inscribing methods such as printings, depressed engravings, and the like.

In detail, the 3-dimensional touch pad 130 of the electronic device shown in FIG. 7 includes a left upper touchable point for inputting a user command "back," a left lower touchable point for inputting a user command "|◄ ◄," a right upper touchable point for inputting a user command "Menu," and a right lower touchable point for inputting a user command "► ►|." Also, corresponding user command guides are visually displayed in the left upper touchable point, the left lower touchable point, the right upper touchable point, and the right lower touchable point.

The user command guides may be displayed around the 3-dimensional touch pad 130 not on the 3-dimensional touch pad 130. For example, in the electronic device shown in FIG. 7, a user command guide is displayed at the outer edge of the electronic device positioned outside the 3-dimensional touch pad 130. Also, in this case, the user command guide that may be input through a touchable point is displayed correctly next to the touchable point.

As described above, a user command that may be input through a touch of a touchable point may be relatively frequently used so as to provide convenience to the user.

A user command guide may be displayed on the main LCD 110 of the electronic device not on or around the 3-dimensional touch pad 130. In this case, a position of the main LCD 110 in which the user command guide is displayed may visually correspond to a position of a touchable point of the 3-dimensional touch pad 130 touched to input a user command.

Also, in this case, the 3-dimensional touch pad 130 may display a touch guide in the touchable point thereon using a light emitting function. The touch guide is information indicating the touchable point on the 3-dimensional touch pad 130 through emitting of light. Thus, a user may perceive a position of the touchable point on the 3-dimensional touch pad 130 through the touch guide.

Figure 8A:
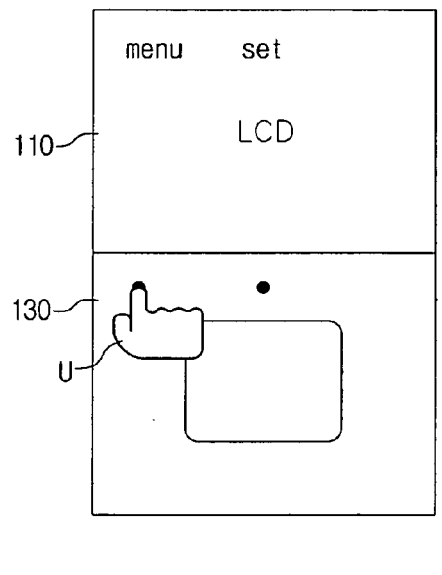
FIGS. 8A and 8B are views illustrating an exemplary 3-dimensional touch pad displaying a touch guide in a touchable point using a light emitting function.

In other words, as shown in FIG. 8A, user command guides are displayed on a main LCD 110 and touch guides are displayed in touchable points on a 3-dimensional touch pad 130. Positions of the user command guides on the main LCD 110 visually correspond to positions of the touchable points of the 3-dimensional touch pad 130 touched to input the user commands.

Referring to FIG. 8A, a position of a user command "menu" displayed on the main LCD 110 visually corresponds to a position of a left upper touchable point on the 3-dimensional touch pad 130 touched to input the user command "menu." Also, a position of a user command "set" displayed on the main LCD 110 visually corresponds to a position of an intermediate upper touchable point on the 3-dimensional touch pad 130 touched to input the user command "set."

If the upper touchable point is touched by a user U as shown in FIG. 8A, the user command "menu" is input.

Figure 8B:
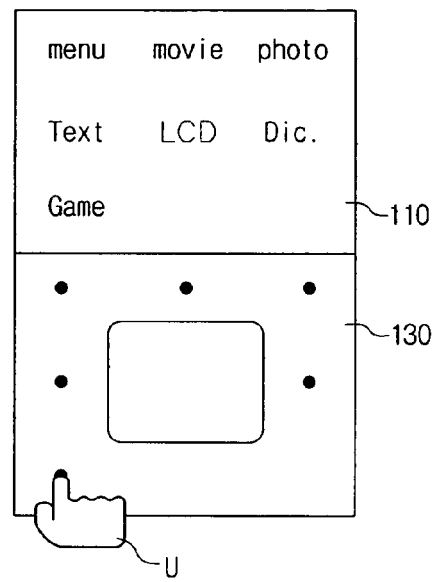

Referring to FIG. 8B, touch guides are displayed at a left upper touchable point, an intermediate touchable point, a right upper touchable point, a left intermediate touchable point, a right intermediate touchable point, and a left lower touchable point on the 3-dimensional touch pad 130 respectively touched to input user commands "Menu," "Movie," "Photo," "Text," "Dic.," and "Game."

Also, positions of touchable points on the 3-dimensional touch pad 130 visually correspond to positions of user command guides to user commands displayed on the main LCD 110, the user command guides being input by touching the touchable points. If the left lower touchable point is touched by a user U as shown in FIG. 8B, the user command "Game" is input.

The positions of the user command guides on the main LCD 110 may visually correspond to the positions of the touchable points on the 3-dimensional touch pad 130, the touchable points being touched to input the user commands, and colors of the user command guides are equal to those of touch guides so as to help a user with easy perception.

It has been described that the 3-dimensional touch pad 130 has a square ring shape. However, the 3-dimensional touch pad 130 may not have the square ring shape but may have any shape. The 3-dimensional touch pad 130 may have a square ring shape as shown in FIG. 9A, a ring shape shown in FIG. 9B, or an L shape shown in FIG. 9C.

Figure 9A:
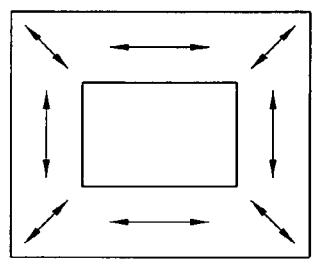
FIGS. 9A through 9C are views illustrating shapes of an exemplary 3-dimensional touch pad.
Figure 9B:
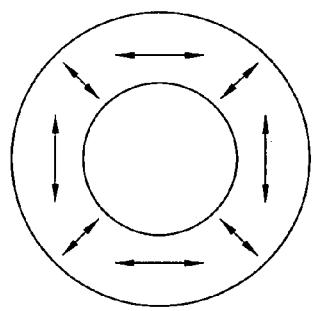
Figure 9C:
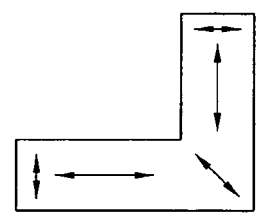

Although not shown in FIGS. 9A through 9C, the 3-dimensional touch pad 130 may have a circular shape, a square shape, a C shape, or any other shape.

Figure 10:
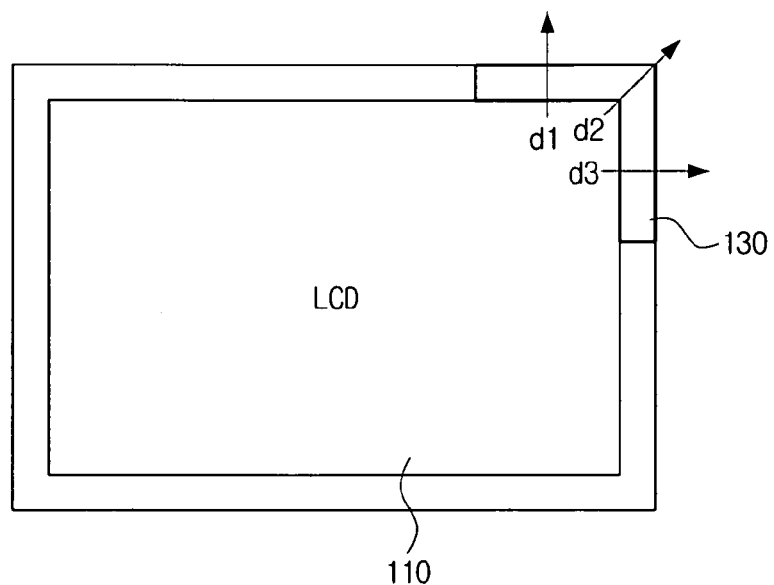
FIG. 10 is a view illustrating an exemplary 3-dimensional touch pad positioned at a corner of an electric device.

In a case where the 3-dimensional touch pad 130 has an L shape, the 3-dimensional touch pad 130 may be positioned at a corner of an electronic device as shown in FIG. 10. In this case, the 3-dimensional touch pad 130 may be realized so as to form a slope descending from the electronic device toward the outside, in other words toward directions d1, d2, and d3.

In a case where the 3-dimensional touch pad 130 has a square ring shape as shown in FIG. 1 or a ring shape, the manipulation button 120 may be provided inside the 3-dimensional touch pad 130. A user may press the manipulation button 120 to input a specific user command.

The manipulation button 120 may be easily found and easily manipulated by the user and thus realized to input frequently used user commands.

Also, the manipulation button 120 is positioned inside the 3-dimensional touch pad 130 and thus may be used to input user commands related to user commands input through the 3-dimensional touch pad 130. For example, the 3-dimensional touch pad 130 is used to input a user command to move a pointer (cursor) on a menu or a list displayed on a 3-dimensional GUI displayed on the main LCD 110. Thus, the manipulation button 120 is used to input a user command to select or execute menu and/or list items of items of a menu and/or a list indicated by the pointer (cursor).

Figure 11A:
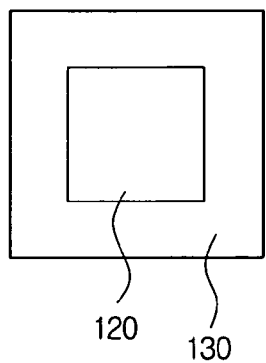
FIGS. 11A and 11B are views illustrating exemplary manipulation buttons positioned inside a 3-dimensional touch pad.
Figure 11B:
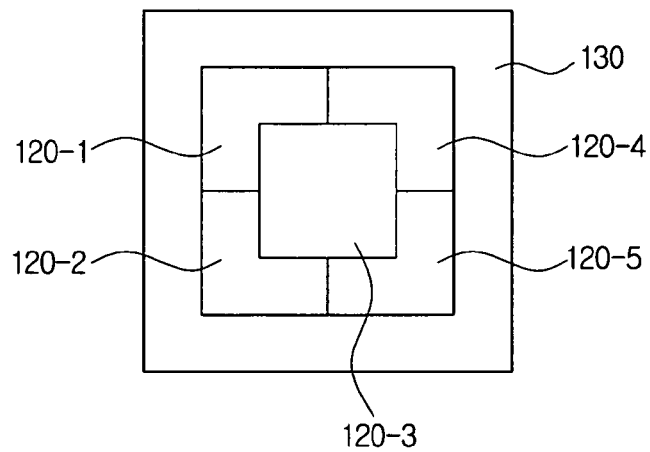

One manipulation button 120 may be provided as shown in FIG. 11A, and a plurality of manipulation buttons 120-1, 120-2, 120-3, 120-4, and 120-5 may be provided as shown in FIG. 11B. In other words, a number of manipulation buttons positioned inside the 3-dimensional touch pad 130 is not limited but may vary.

Figure 12:
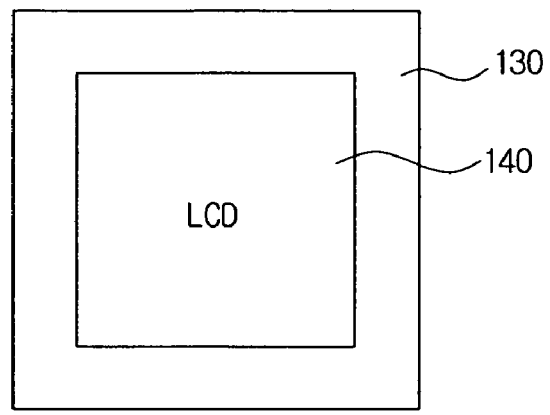
FIG. 12 is a view illustrating an exemplary auxiliary liquid crystal display (LCD) positioned inside a 3-dimensional touch pad.
Figure 13:
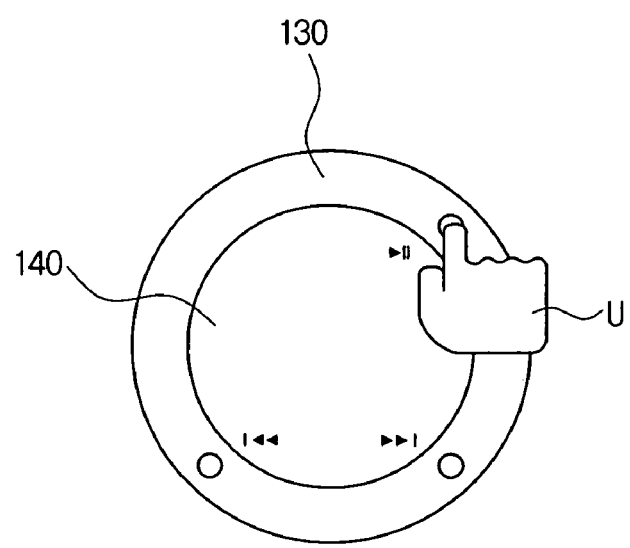
FIG. 13 is a view illustrating an exemplary auxiliary LCD on which a user command guide is displayed.

Not the manipulation button 120 but an auxiliary LCD 140 may be provided inside the 3-dimensional touch pad 130 as shown in FIG. 12. In this case, user command guides may be displayed on the auxiliary LCD 140 as shown in FIG. 13. However, the 3-dimensional touch pad 130 may have a ring shape not a square ring shape as shown in FIG. 13 and include an auxiliary LCD 140 having a circular shape.

Thus, a user U may input a desired user command through the 3-dimensional touch pad 130 with reference to a user command guide displayed on the auxiliary LCD 140. In detail, the user U may touch a touchable point positioned around (rightly next to) the user command guide displayed on the auxiliary LCD 140 to input the user command.

Here, a touch guide may be displayed at the touchable point on the 3-dimensional touch pad 130 through emitting of light as shown in FIG. 13. In addition, the user command guide displayed on the auxiliary LCD 140 may have the same color as the touch guide so as to help the user U with the easy perception.

If the user touches a touchable point positioned in a right upper portion on the 3-dimensional touch pad 130 as shown in FIG. 13, a user command "▶||" is input.

Also, a rubbing guide as described above may be displayed on the auxiliary LCD 140.

The auxiliary LCD 140 provided inside the 3-dimensional touch pad 130 may be a touchable LCD not a LCD for a display. If the auxiliary LCD 140 is the touchable LCD, a user command may be input using only the auxiliary LCD 140 excluding the 3-dimensional touch pad 130.

Both the manipulation button 120 and the auxiliary LCD 140 may be provided inside the 3-dimensional touch pad 130. The 3-dimensional touch pad 130 may be void. This may be selectively determined depending on the necessity of a manipulation of an electronic device.

Figure 14:
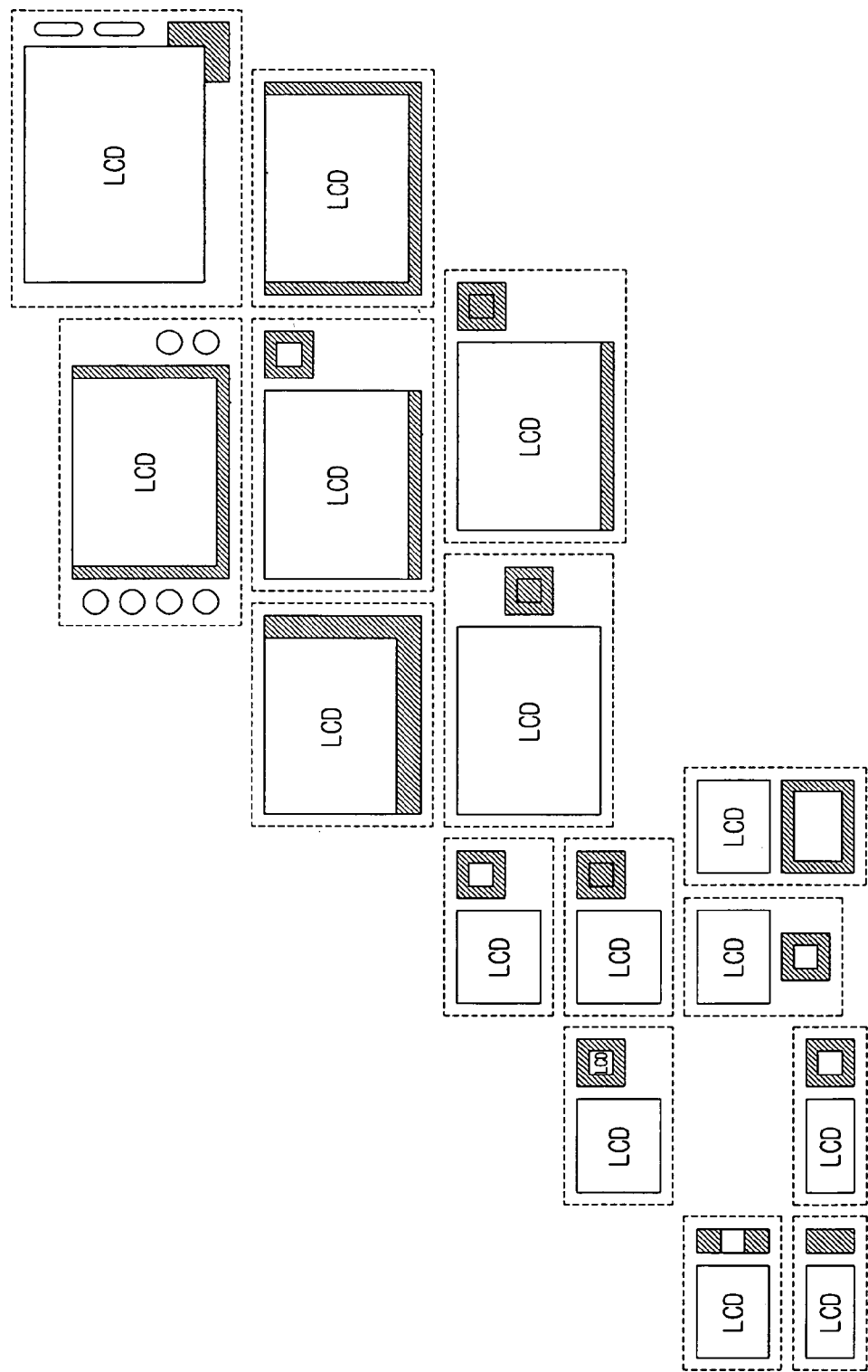
FIG. 14 is a view illustrating examples of electronic devices realized by selectively providing main LCDs, manipulation buttons, 3-dimensional touch pads, and auxiliary LCDs and disposing them using various methods.

Based on the above-described contents, electronic devices selectively including main LCDs 110, manipulation buttons 120, 3-dimensional touch pads 130, and auxiliary LCDs 140 and disposed using various methods are shown in FIG. 14.

As shown in FIG. 14, parts marked with a dark color correspond to the 3-dimensional touch pads 130, and parts marked with LCDs outside the 3-dimensional touch pads 130 correspond to the main LCDs 110. Also, parts marked with a light color inside the 3-dimensional touch pads 130 correspond to the manipulation buttons 120, parts marked with LCDs inside the 3-dimensional touch pads 130 correspond to auxiliary LCDs 140 for displays, and parts marked with a dark color inside the 3-dimensional touch pads 130 correspond to touchable auxiliary LCDs 140.

The electronic devices shown in FIG. 14 are only examples of electronic devices that may be realized based on the above-described contents. Thus, electronic devices having different shapes from the electronic devices shown in FIG. 14 may be suggested.

Such exemplary electronic devices will now be described in more detail with reference to FIGS. 15 through 19.

Figure 15:
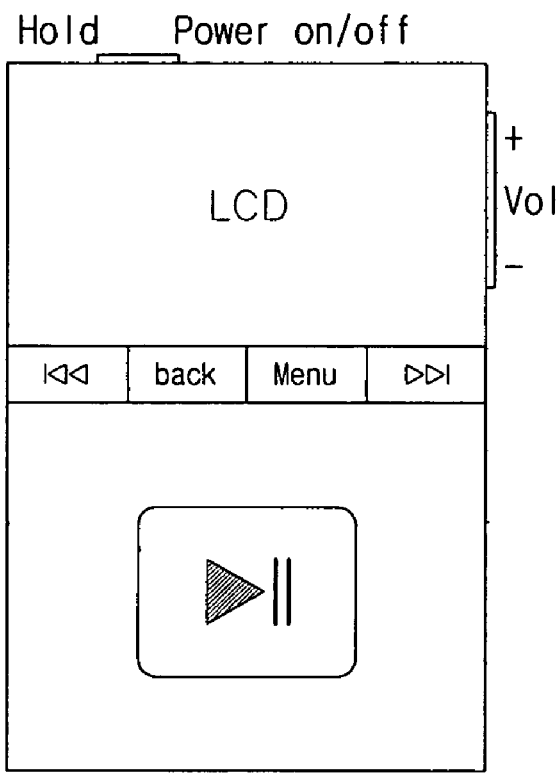
FIG. 15 is a view illustrating an exemplary MP3 player suitable to be used in a lengthwise direction.
Figure 16B:
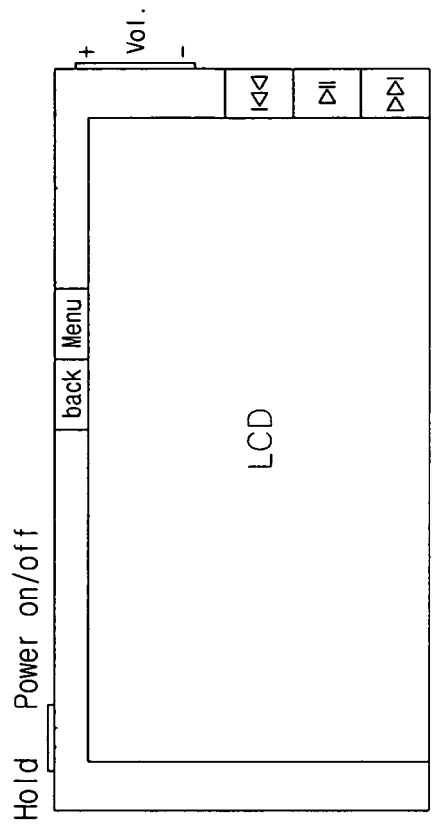
FIGS. 16A and 16B are views illustrating exemplary MP3 players suitable to be used in a widthwise direction.
Figure 16A:
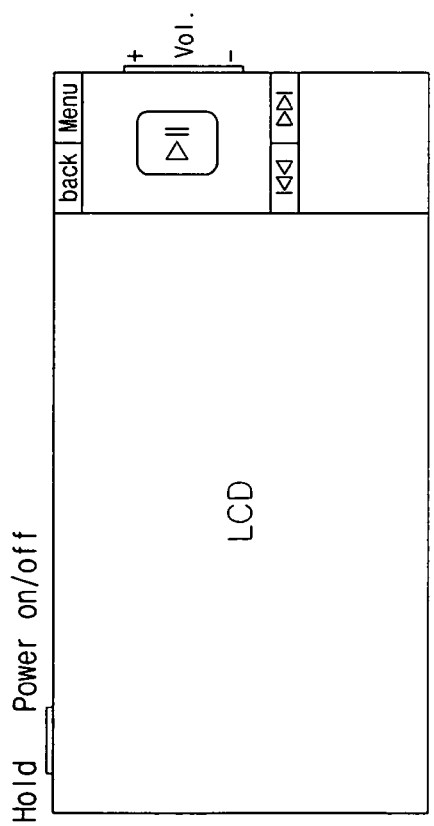
Figure 17:
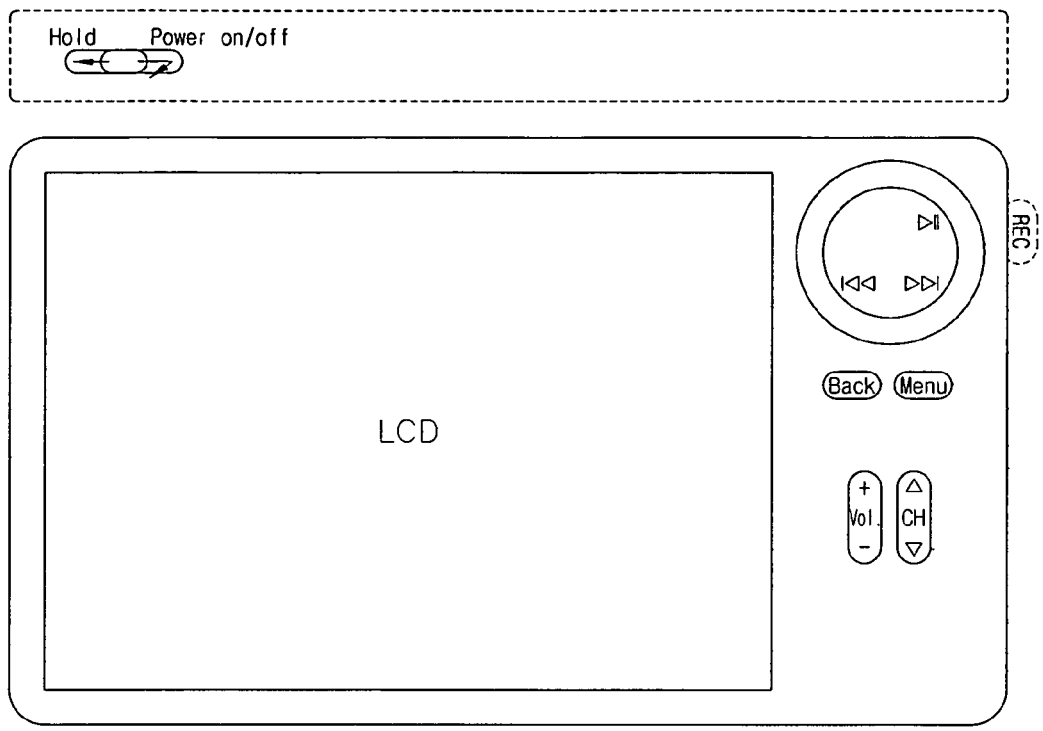
FIG. 17 is a view illustrating an exemplary digital multimedia broadcast (DMB) player.
Figure 18:
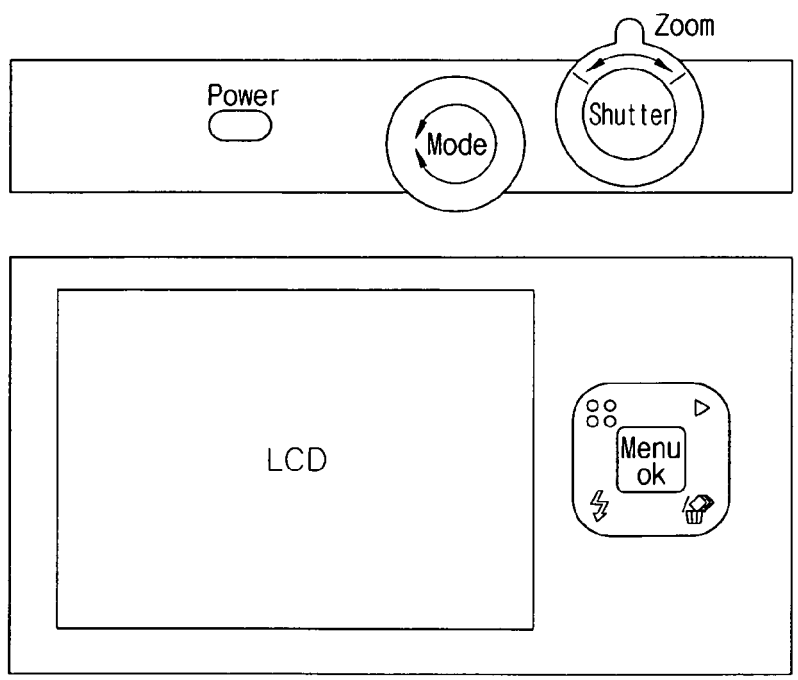
FIG. 18 is a view illustrating an exemplary digital camera.
Figure 19A:
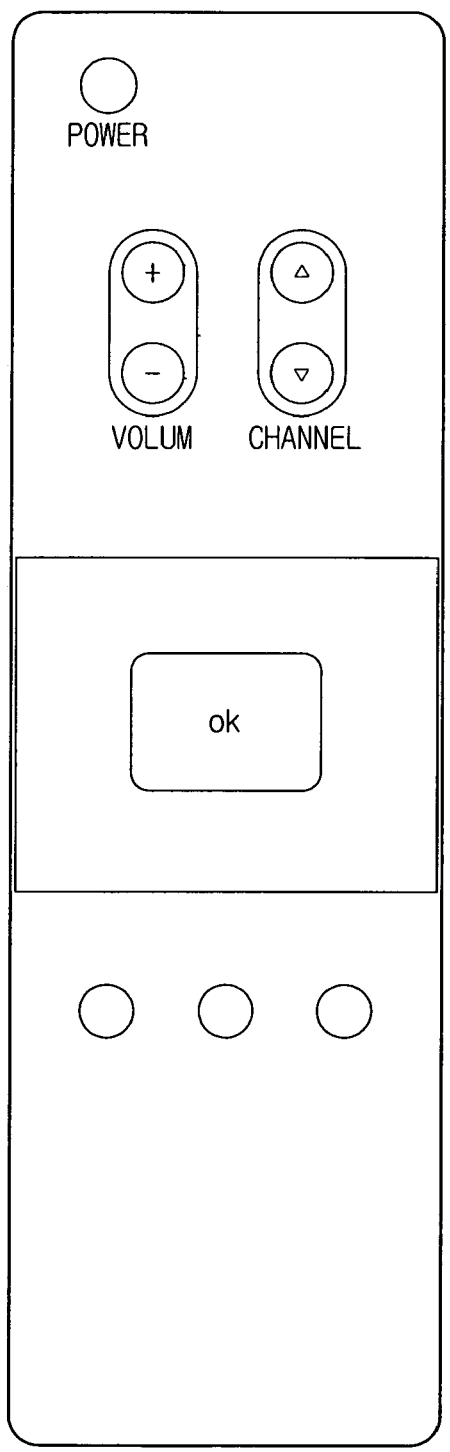
FIGS. 19A and 19B are views illustrating exemplary remote controllers.
Figure 19B:
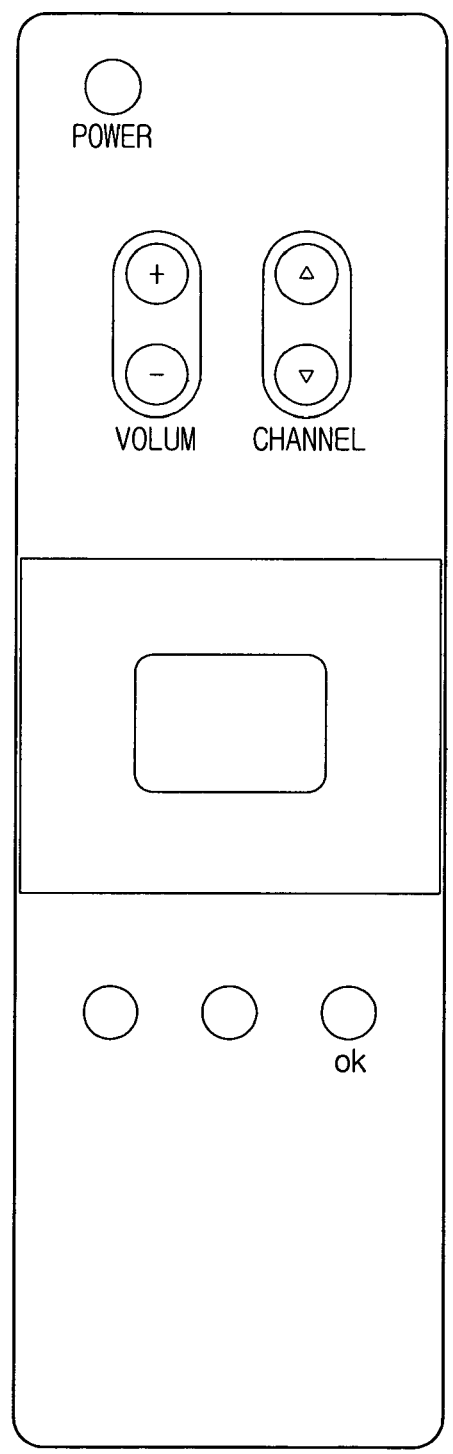

FIG. 15 is a view illustrating an MP3 player suitable to be used in a lengthwise direction, FIGS. 16A and 16B are views illustrating MP3 players suitable to be used in a widthwise direction. FIG. 17 is a view illustrating a DM1 player, FIG. 18 is a view illustrating a digital camera, and FIGS. 19A and 19B are views illustrating remote controls.

Manipulation announcement light emitting and state announcement light emitting may be performed using the light emitting function of the 3-dimensional touch pad 130. The manipulation announcement light emitting is a light emitting operation for visually announcing that a user rubs or touches the 3-dimensional touch pad 130, and the state announcement light emitting is a light emitting operation for announcing a current operation state of an electronic device.

Thus, the user may immediately perceive the manipulations input through the 3-dimensional touch pad 130 and the current operation state of the electronic device and be provided with a high visual effect.

The manipulation announcement light emitting will now be described with detailed examples.

Figure 20:
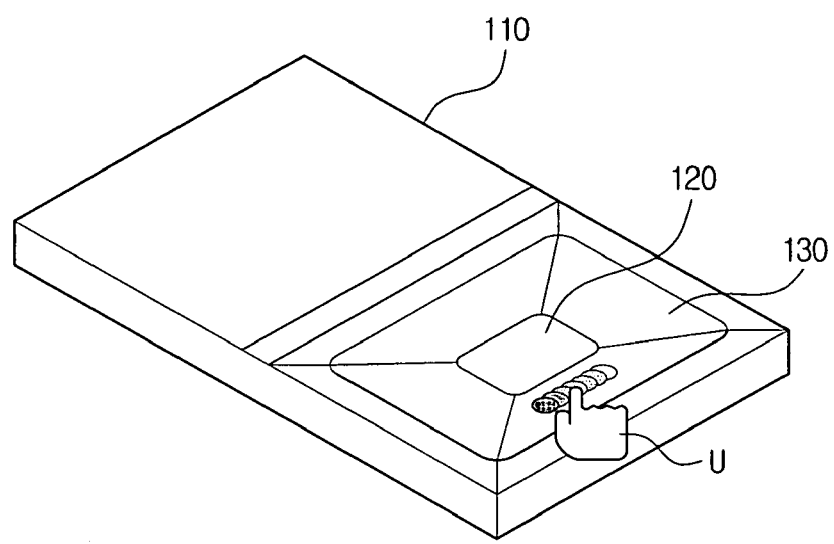
FIGS. 20 and 21A through 21D are views illustrating manipulation announcement light emitting for rubbing input manipulations of a user through a 3-dimensinal touch pad.

Manipulation announcement light emitting for a rubbing input manipulation of a user through the 3-dimensional touch pad 130 will be taken as an example. For example, in a case where a user U inputs left-rubbing through a 3-dimensional touch pad 130 as shown in FIG. 20, the 3-dimensional touch pad 130 emits light so that the light seems like moving along a direction of the left-rubbing input by the user U.

Figure 21A:
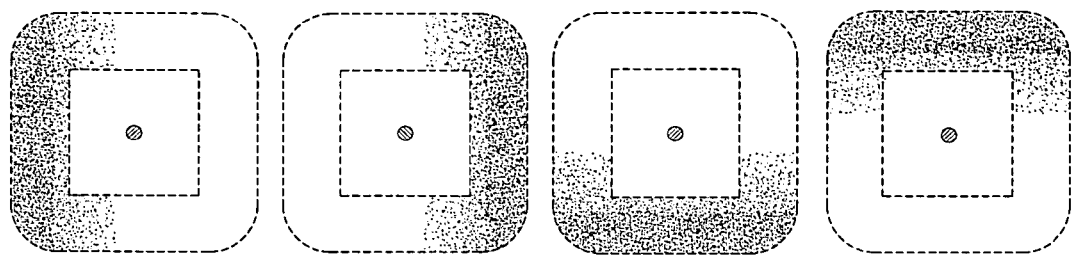

Manipulation announcement light emitting for a touch input manipulation of a user through the 3-dimensional touch pad 130 will be taken as an example. For example, in a case where a user touches touchable points of the 3-dimensional touch pad 130 as shown in FIG. 21A, the 3-dimensional touch pad 130 lightly emits light at the touchable points touched by the user and the surroundings.

Figure 21B:
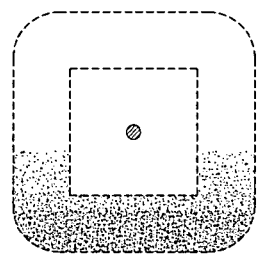

Manipulation announcement light emitting for a push (strong touch) input manipulation of a user through the 3-dimensional touch pad 130 will be taken as an example. For example, in a case where the user pushes a touchable point as shown in FIG. 21B, the 3-dimensional touch pad 130 emits deep light at the touchable point pushed by the user and the surrounding. This corresponds to manipulation announcement light emitting using a method of varying a light emission degree with the strength of a touch.

Manipulation announcement light emitting for in-rubbing and/or out-rubbing input manipulations of a user through the 3-dimensional touch pad 130 will be taken as an example. For example, in a case where the user performs in-rubbing on the 3-dimensional touch pad 130 as shown in the left part of FIG. 21C, the 3-dimensional touch pad 130 emits light gradually deeply from the outside toward the inside so as to express an effect of going inward or an effect of going downward. This corresponds to a case where manipulation announcement light emitting for in-rubbing and/or out-rubbing input manipulations is provided to a user through variations in the brightness of emitted light.

Figure 21C:
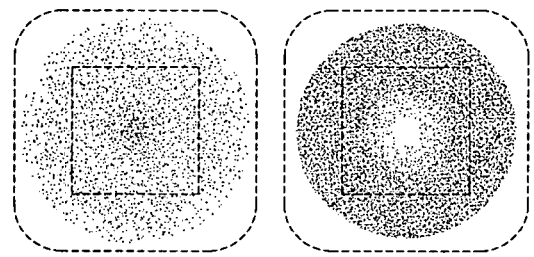

In a case where the user performs out-rubbing on the 3-dimensional touch pad 130 as shown in the right part of FIG. 21C, the 3-dimensional touch pad 130 emits light gradually deeply from the inside toward the outside so as to express an effect of going outward or an effect of going upward.

Figure 21D:
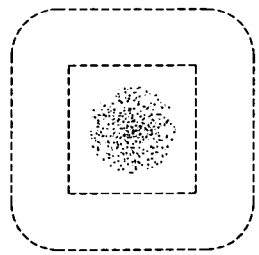

The manipulation announcement light emitting may be performed by the auxiliary LCD 140 besides the 3-dimensional touch pad 130. In other words, in a case where the user touches a touchable auxiliary LCD 140 as shown in FIG. 21D, the touchable auxiliary LCD 140 emits light at a point touched by the user and the surrounding.

State announcement light emitting will now be described with detailed examples.

State announcement light emitting for a conversion from a power-off state of an electronic device into a power-on state will be taken as an example. In this case, the 3-dimensional touch pad 130 may randomly vary a light emitting point to emit light.

State announcement light emitting for a conversion into a holding state of the electronic device will be taken as an example. In this case, the 3-dimensional touch pad 130 may periodically emit and then extinguish (flicker) light at specific light emitting points.

State announcement light emitting for a conversion of the electronic device into a play state will be taken as an example. In this case, the 3-dimensional touch pad 130 emits light so that the light seems like rotating along a ring shape of the 3-dimensional touch pad 130.

Figure 22:
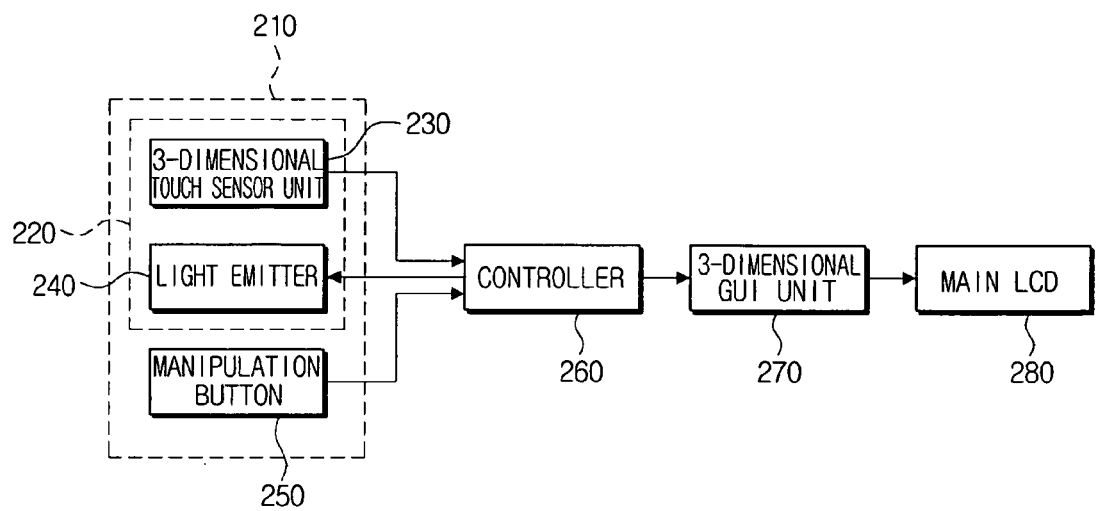
FIG. 22 is a block diagram of an electronic device for inputting a user command 3-dimensionally according to an exemplary embodiment of the present invention.

An internal structure of an electronic device will now be described in detail with reference to FIG. 22. FIG. 22 is a block diagram of an electronic device for 3-dimensionally inputting a user command according to an exemplary embodiment of the present invention.

As shown in FIG. 22, the electronic device includes a PUI unit 210, a controller 260, a 3-dimensional GUI unit 270, and a main LCD 280. The PUI unit 210 includes a 3-dimensional touch pad 220 and a manipulation button 250, and the 3-dimensional touch pad 220 includes a 3-dimensional touch sensor unit 230 and a light emitter 240.

The main LCD 280, the manipulation button 250, and the 3-dimensional touch pad 220 respectively correspond to the main LCD 110, the manipulation button 120, and the 3-dimensional touch pad 130 shown in FIG. 1.

The 3-dimensional touch sensor unit 230 of the 3-dimensional touch pad 220 senses 3-dimensional rubbing and a touch of a user and transmits the sensed results to the controller 260 that will be described later.

Figure 23:
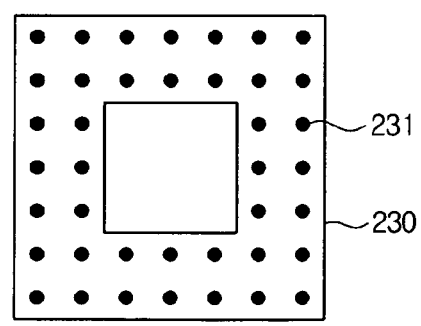
FIG. 23 is a view illustrating a disposition state of exemplary touch sensors inside a 3-dimensional touch sensor unit.

As shown in FIG. 23, the 3-dimensional touch sensor unit 230 includes touch sensors 231 disposed in two rows. Here, the touch sensors 231 are disposed in the two rows in the 3-dimensional touch sensor unit 230 so as to sense in-rubbing and/or out-rubbing. The touch sensors 231 may be disposed in two or more rows.

The light emitter 240 of the 3-dimensional touch pad 220 is positioned under the 3-dimensional touch sensor unit 230. The light emitter 240 includes a plurality of light emitting diodes (LEDs). The light emitter 240 emits light under the control of the controller 260 so as to perform a light emitting function of the 3-dimensional touch pad 220.

The manipulation button 250 senses touches of a user and transmits the sensed results to the controller 260.

The 3-dimensional GUI unit 270 generates a 3-dimensional GUI. The main LCD 280 is a display displaying the 3-dimensional GUI generated by the 3-dimensional GUI unit 270.

The controller 260 deciphers a user command with reference to the sensed results of the 3-dimensional touch sensor unit 230 and the sensed results of the manipulation button 250. The controller 260 also controls the 3-dimensional GUI unit 270 to generate the 3-dimensional GUI coinciding with the deciphered user command.

The controller 260 may be understood as controlling contents displayed on the main LCD 280 according to the user command.

The controller 260 also controls a light emitting operation of the light emitter 240 so as to display a rubbing guide and a touch guide. In addition, the controller 260 controls the light emitting operation of the light emitter 240 so as to perform manipulation announcement light emitting and state announcement light emitting.

The controller 260 controls other elements (not shown) of the electronic device to execute the deciphered user command.

Although not shown in FIG. 22, the electronic device according to an exemplary embodiment may further include an auxiliary LCD. In this case, the auxiliary LCD may be an auxiliary LCD for a display or a touchable auxiliary LCD. Contents displayed on the auxiliary LCD are determined by the controller 260. Also, a result of sensing a touch of a user through the touchable auxiliary LCD is transmitted to the controller 260.

Figure 24:
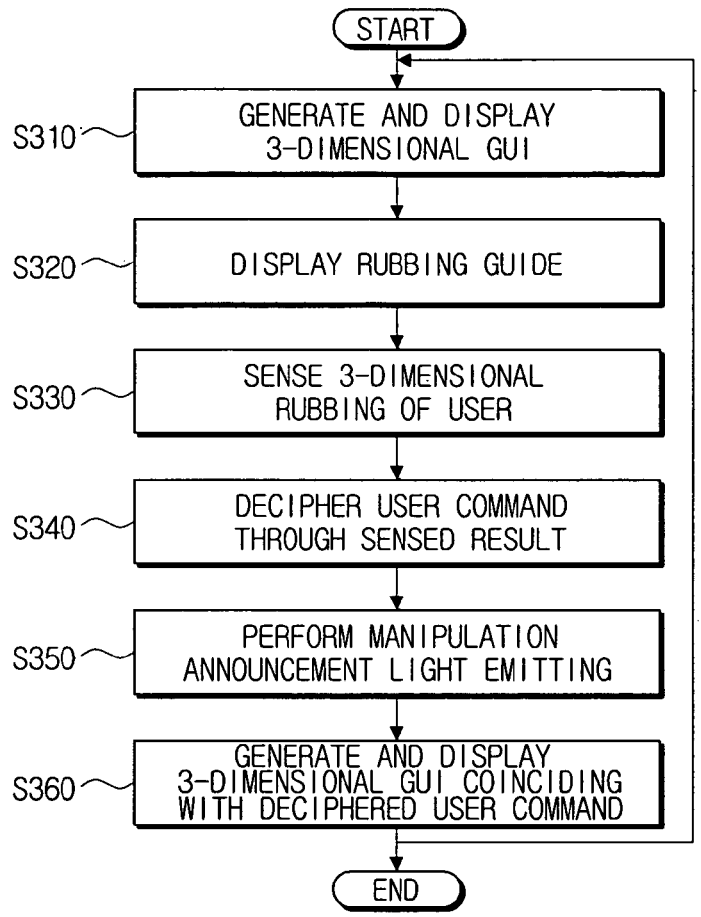
FIG. 24 is a flowchart of a method of changing a 3-dimensional GUI according to a 3-dimensionally input user command according to an exemplary embodiment of the present invention.

A process of 3-dimensionally inputting a user command and changing a 3-dimensional GUI according to the input user command in the electronic device shown in FIG. 22 will now be described in detail with reference to FIG. 24. FIG. 24 is a flowchart of a method of changing a 3-dimensional GUI according to a 3-dimensionally input user command according to an exemplary embodiment of the present invention.

In operation S310, the 3-dimensional GUI unit 270 generates a 3-dimensional GUI under the control of the controller 260, and the main LCD 280 displays the 3-dimensional GUI.

In operation S320, the light emitter 240 displays a rubbing guide under the control of the controller 260.

In operation S330, the 3-dimensional touch sensor unit 230 senses 3-dimensinal rubbing of a user and transmits the sensed result to the controller 260.

In operation S340, the controller 260 deciphers a user command through the sensed result. In operation S350, the light emitter 240 executes manipulation announcement light emitting under the control of the controller 260.

In operation S360, the controller 260 controls the 3-dimensional GUI unit 270 to generate the 3-dimensional GUI coinciding with the deciphered user command so that the 3-dimensional GUI can be displayed on the main LCD 280.

Thereafter, operations S320 through S360 are repeated.

Operation S360 will now be described with a detailed example.

A user command deciphered by the controller 260 when the 3-dimensional touch sensor unit 230 senses up-rubbing and/or down-rubbing, in other words a user command that may be input through up-rubbing and/or down-rubbing, will be described with a detailed example.

The up-rubbing and/or down-rubbing are used to input a user command to move a 3-dimensional GUI picture or contents displayed on the 3-dimensional GUI picture up and/or down (on a Y-axis) or vary it or them with its movement or their movement up and/or down.

Figure 25:
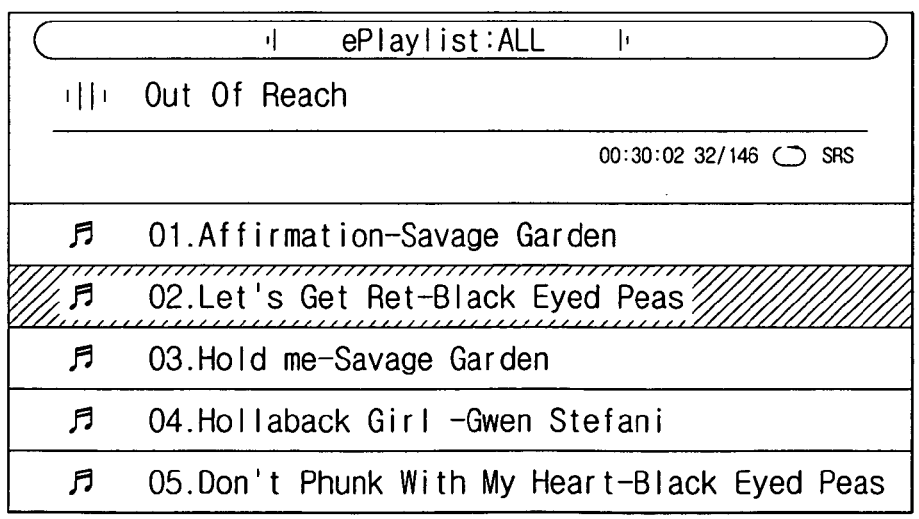

In a case where a GUI picture shown in FIG. 25 is displayed on the main LCD 280, up-rubbing and/or down-rubbing sensed by the 3-dimensional touch sensor unit 230 are used to input a user command to move a pointer (cursor) displayed on the GUI picture up and/or down (on a Y-axis).

If a user continuously puts a finger on the 3-dimensional touch sensor unit 230 after the up-rubbing and/or down-rubbing, the pointer (cursor) may move at a high speed.

The up-rubbing and/or down-rubbing may be used to input a user command to move the pointer (cursor) displayed on the GUI picture up and/or down (on the Y-axis) and move an item indicated by the moved pointer (cursor) to another position with zooming in the item.

For example, in a case where a GUI picture shown in FIG. 26A is displayed on the main LCD 280, down-rubbing sensed by the 3-dimensional touch sensor unit 230 may be used to input to a user command to move a pointer (cursor) to a second list item as shown in FIG. 26B and move the second list item to the top with zooming in the second list item indicated by the moved pointer (cursor) as shown in FIG. 26C.

Left-rubbing and/or right-rubbing are used to input a user command to move a 3-dimensional GUI picture or contents displayed on the 3-dimensional GUI picture to the left and/or right (on an X-axis) or vary it or them with its movement or their movements to the left and/or right.

For example, in a case where a GUI picture displaying a list of a folder "2 Album" shown in FIG. 27A is displayed on the main LCD 280, right-rubbing sensed by the 3-dimensional touch sensor unit 230 may be used to input a user command to slowly (sequentially) move a pointer to a GUI picture displaying lists of a folder "3 Album" next to the folder "2 Album" as shown in FIGS. 27B, 27C, and 27D.

Figure 28A:
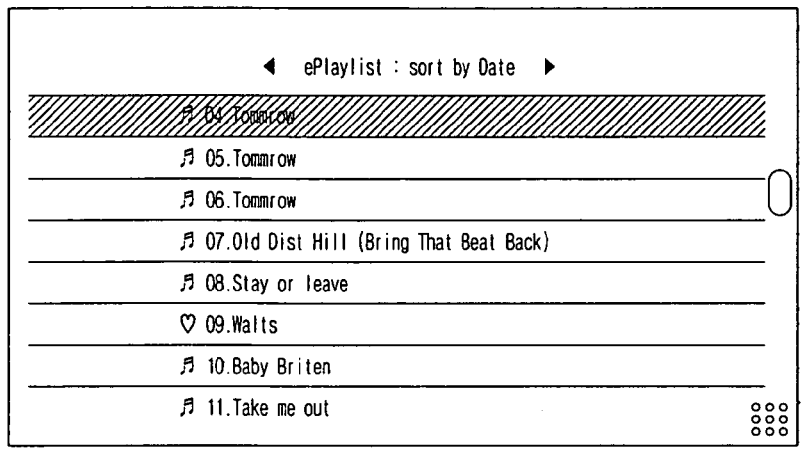
Figure 28B:
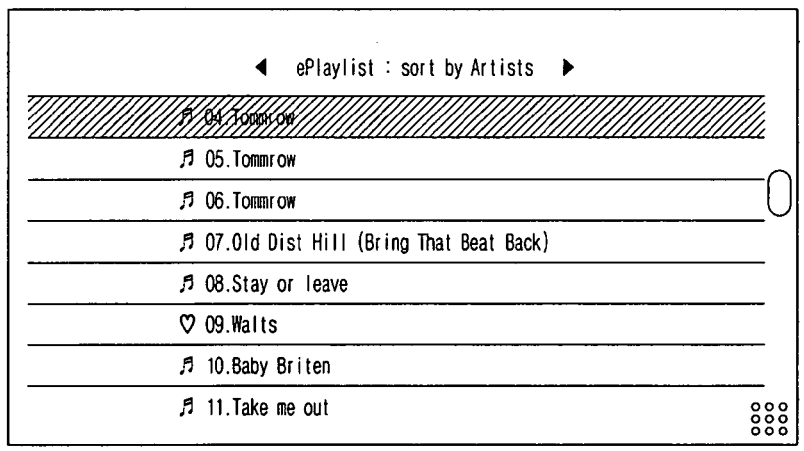
Figure 28C:
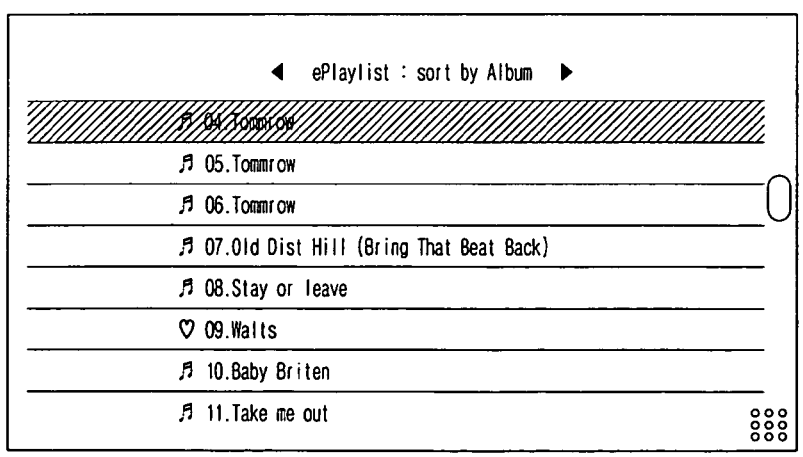

As another example, in a case where a GUI picture displaying lists sorted according to "Date" shown in FIG. 28A is displayed on the main LCD 280, left-rubbing and/or right-rubbing sensed by the 3-dimensional touch sensor unit 230 may be used to input a user command to move a pointer to a GUI picture displaying lists sorted according to "Artist" as shown in FIG. 28B or a GUI picture displaying lists sorted according to "Album" as shown in FIG. 28C. In this case, the movements to the GUI pictures displaying the lists may be slowly (sequentially) realized.

In-rubbing is used to input a user command for moving a menu indicated by a pointer (cursor) to a lower menu of items, moving to detailed information as to a list item of items of a list indicated by a pointer (cursor), zooming in a displayed image and moving a window on a higher layer to a lower layer in a case of a disposition of a plurality of windows performing different tasks in a multilayer structure.

A user command that may be input through out-rubbing is symmetric to a user command that may be input through in-rubbing. In other words, out-rubbing is used to input a user command for moving from a lower menu to an upper menu, moving from detailed information to a list, zooming out a displayed image and moving a second highest layer to a highest layer in a case of a disposition of a plurality of windows performing tasks in a multilayer structure.

Figure 29:
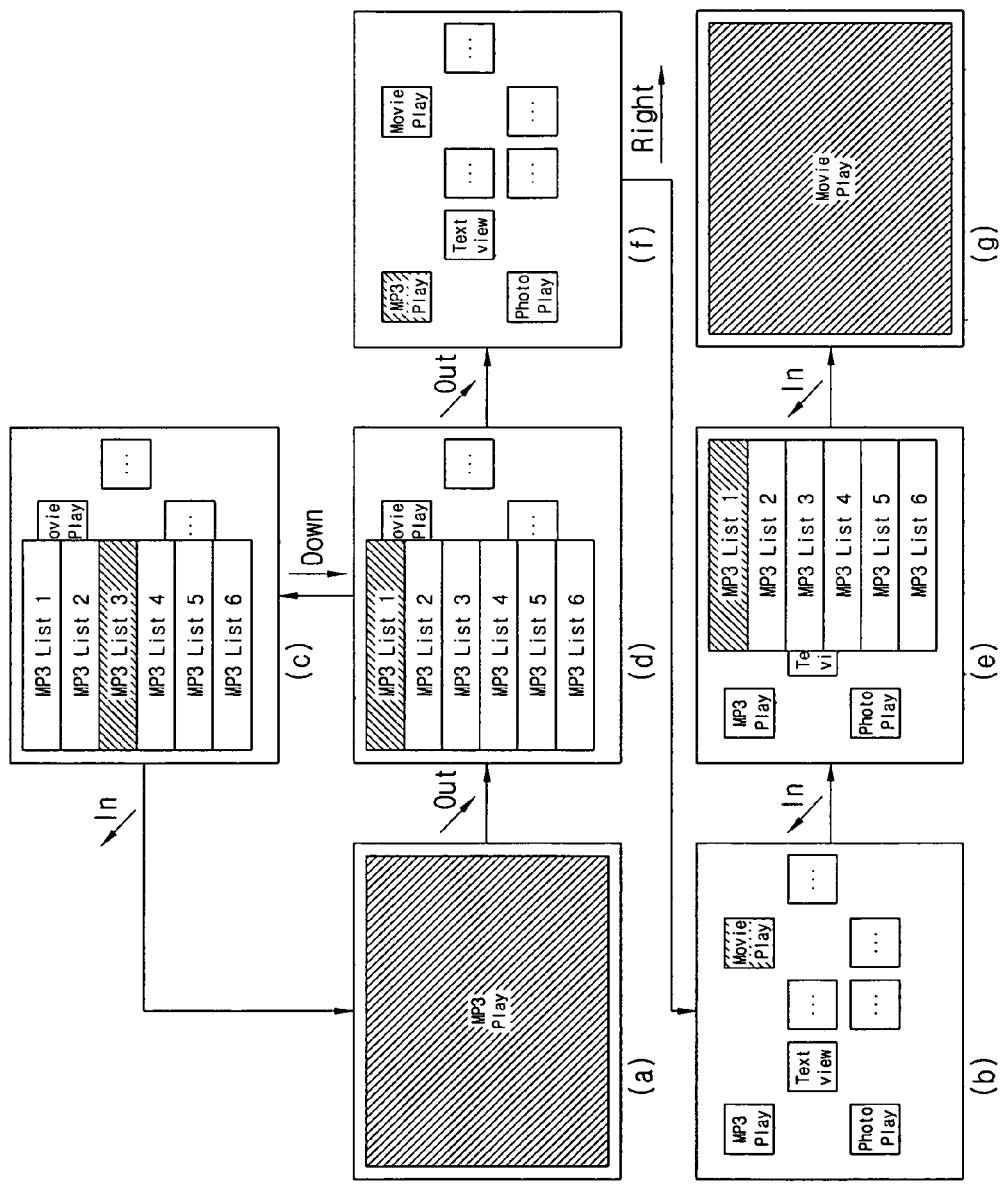

For example, in a case where an electronic device plays an MP3 file as shown in FIG. 29A, out-rubbing sensed by the 3-dimensional touch sensor unit 230 may be used to input a user command to move a pointer to a GUI picture displaying lists including items of MP3 files as shown in FIG. 29D.

In a case where the GUI picture displaying the lists including the items of the MP3 files is displayed on the main LCD 280 as shown in FIG. 29D, out-rubbing sensed by the 3-dimensional touch sensor unit 230 may be used to input a user command to move a pointer to a GUI picture displaying items "MP3 Play," "Movie Play," . . . of an upper menu of an MP3 file list as shown in FIG. 29F.

In a case where the GUI picture as shown in FIG. 29F is displayed on the main LCD 280, right-rubbing sensed by the 3-dimensional touch sensor unit 230 may be used to input a user command to move a pointer (cursor) to the right as shown in FIG. 29B.

In a case where the GUI picture as shown in FIG. 29B is displayed on the main LCD 280, in-rubbing sensed by the 3-dimensional touch sensor unit 230 may be used to input a user command to call a file list "Movie" subordinate to an item "Movie Play" indicated by a pointer (cursor) as shown in FIG. 29E.

In a case where a GUI picture displaying the file list "Movie" as shown in FIG. 29E is displayed on the main LCD 280, in-rubbing sensed by the 3-dimensional touch sensor unit 230 may be used to input a user command to play a file "Movie" indicated by a pointer (cursor) as shown in FIG. 29G.

In a case where the GUI picture as shown in FIG. 29D is displayed on the main LCD 280, down-rubbing sensed by the 3-dimensional touch sensor unit 230 may be used to input a user command to move a pointer (cursor) down as shown in FIG. 29C.

In a case where a GUI picture displaying MP3 file lists is displayed on the main LCD 280 as shown in FIG. 29C, in-rubbing sensed by the 3-dimensional touch sensor unit 230 may be used to input a user command to play a MP3 file indicated by a pointer (cursor) as shown in FIG. 29A.

Figure 30:
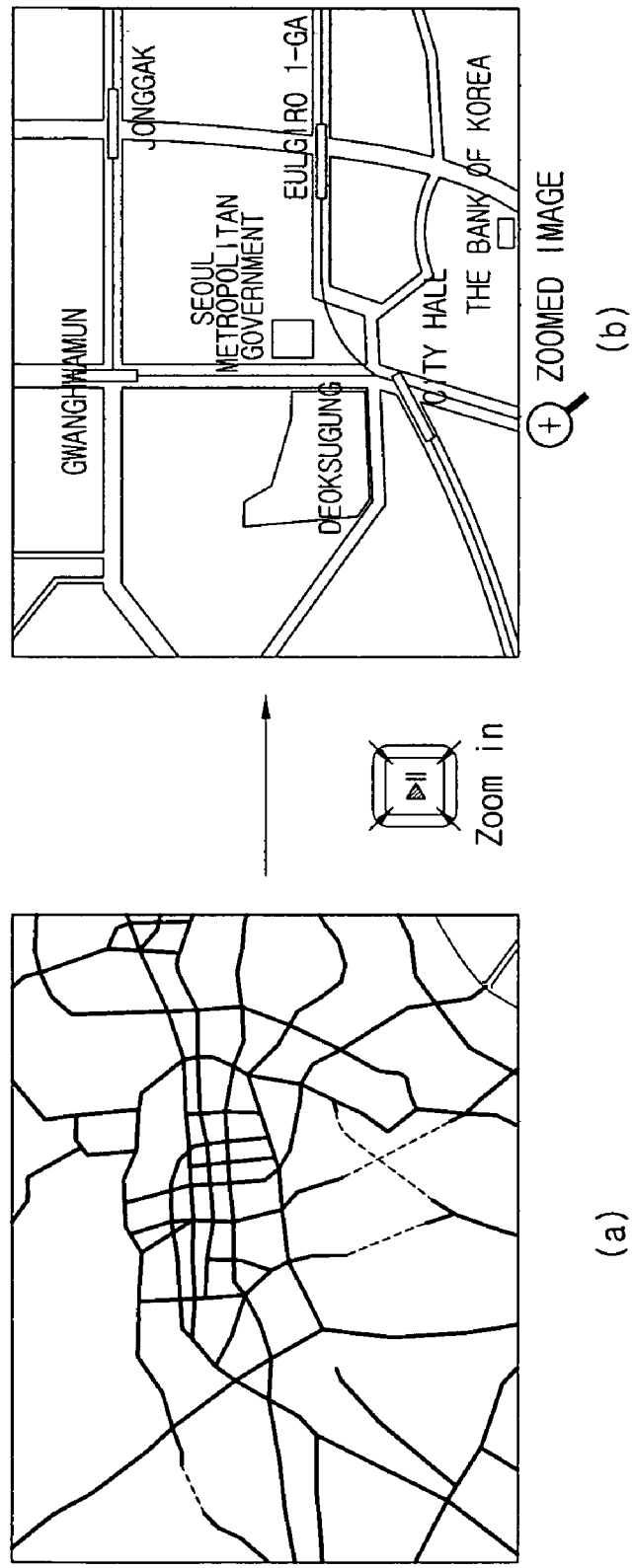

As another example, in a case where a GUI picture displaying a map is displayed on the main LCD 280 as shown in FIG. 30A, in-rubbing sensed by the 3-dimensional touch sensor unit 230 may be used to input a user command to zoom in the map as shown in FIG. 30B.

In a case where the GUI picture displaying the map is displayed on the main LCD 280 as shown in FIG. 30A, out-rubbing sensed by the 3-dimensional touch sensor unit 230 may be used to input a user command to zoom out the map.

Figure 31:
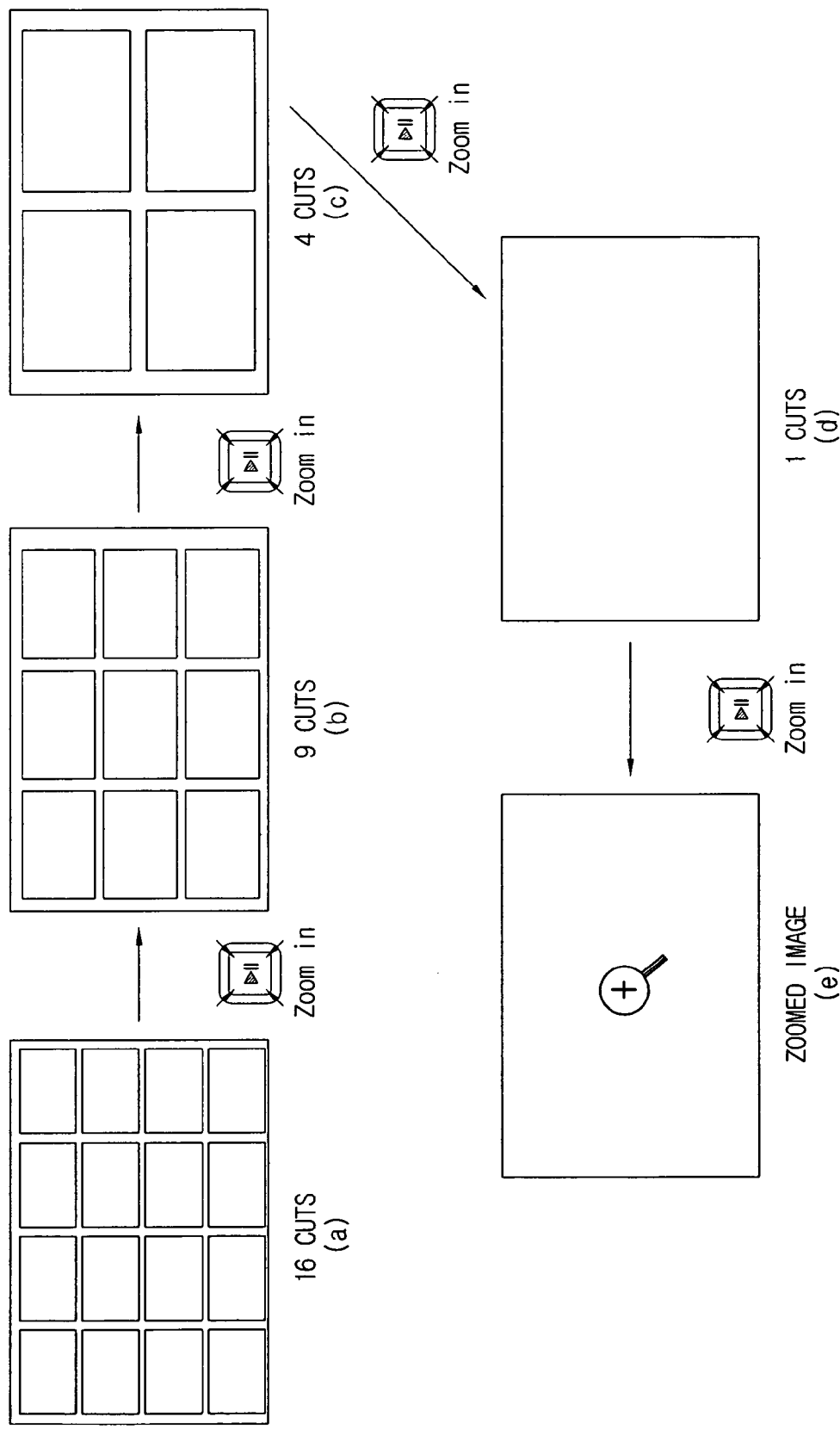

As another example, in a case where a GUI picture displaying a plurality of thumbnail images is displayed on the main LCD 280 as shown in FIG. 31A, in-rubbing sensed by the 3-dimensional touch sensor unit 230 may be used to input a user command to zoom in the thumbnail images instead of reducing a number of thumbnail images displayed on the GUI picture as shown in FIGS. FIGS. 311B, 31C, and 31D.

In a case where a GUI picture displaying an image is displayed on the main LCD 280 as shown in FIG. 31D, in-rubbing sensed by the 3-dimensional touch sensor unit 230 may be used to input a user command to zoom in the image as shown in FIG. 31E.

In a case where a GUI picture displaying a plurality of thumbnail images is displayed on the main LCD 280, out-rubbing sensed by the 3-dimensional touch sensor unit 230 may be used to input a user command to zoom out the thumbnail images instead of increasing a number of thumbnail images displayed on the GUI picture.

Figure 32A:
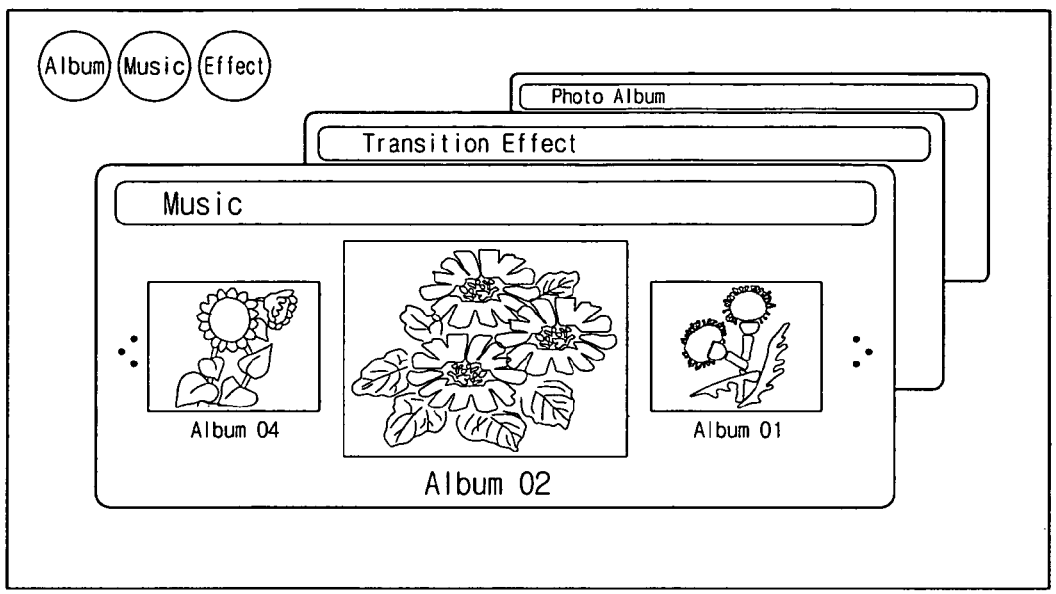
Figure 32B:
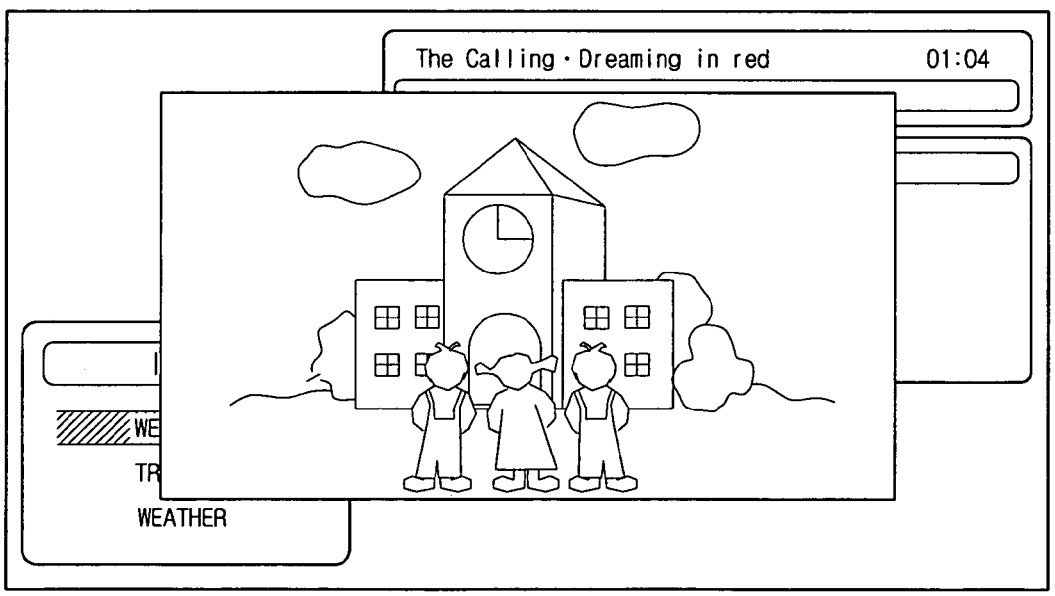

As another example, in a case where a 3-dimensional GUI picture displaying a plurality of windows performing different tasks in a multilayer structure is displayed on the main LCD 280 as shown in FIGS. 32A and 32B, in-rubbing sensed by the 3-dimensional touch sensor unit 230 may be used to input a user command to move a window on a higher layer to a lower layer. Also, out-rubbing may be used to input a user command to move a window on a second highest layer to the highest layer. Here, the movements of the windows may be slowly (sequentially) realized.

Figure 32C:
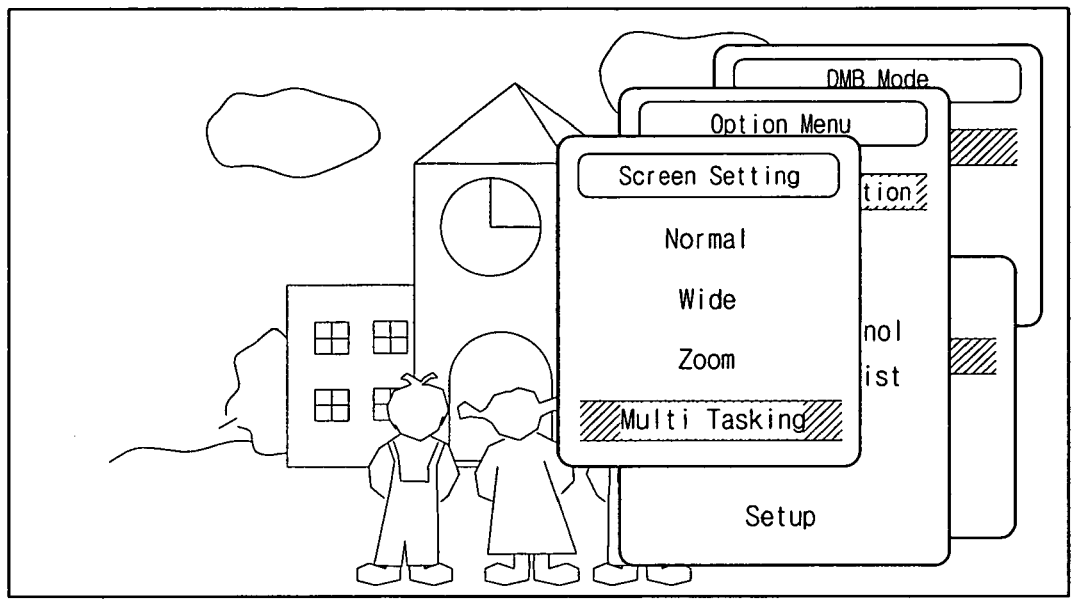
Figure 32D:
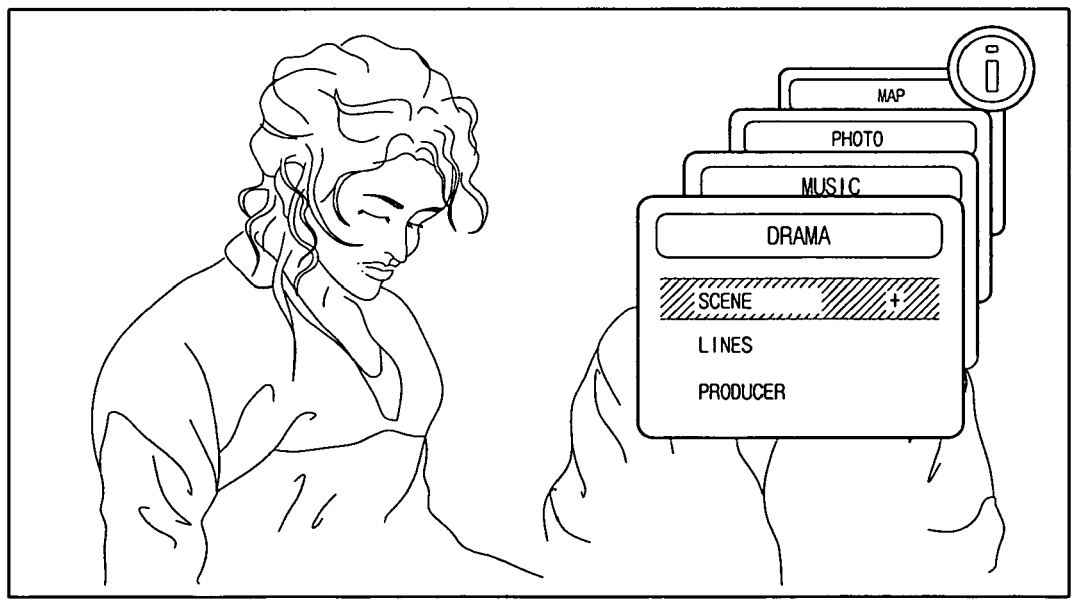

As another example, in a case where a 3-dimensional GUI picture displaying different menus in a multilayer structure is displayed on the main LCD 280 as shown in FIGS. 32C and 32D, in-rubbing sensed by the 3-dimensional touch sensor unit 230 may be used to input a user command to move a menu on a higher layer to a lower layer. Also, out-rubbing may be used to input a user command to move a menu on a second highest layer to the highest layer. Here, the menus may be slowly (sequentially) moved.

Figure 33A:
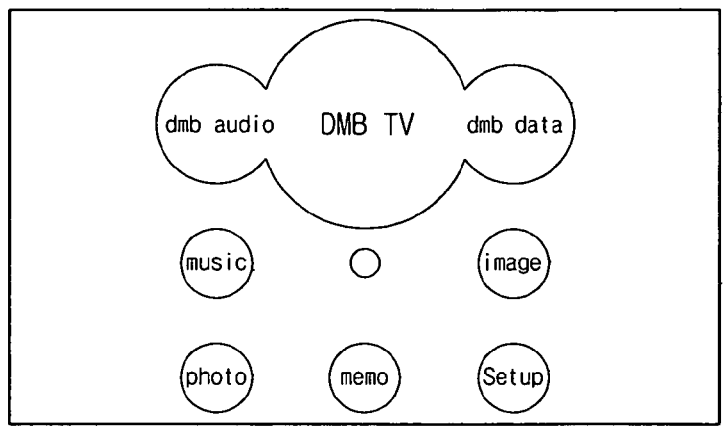
Figure 33B:
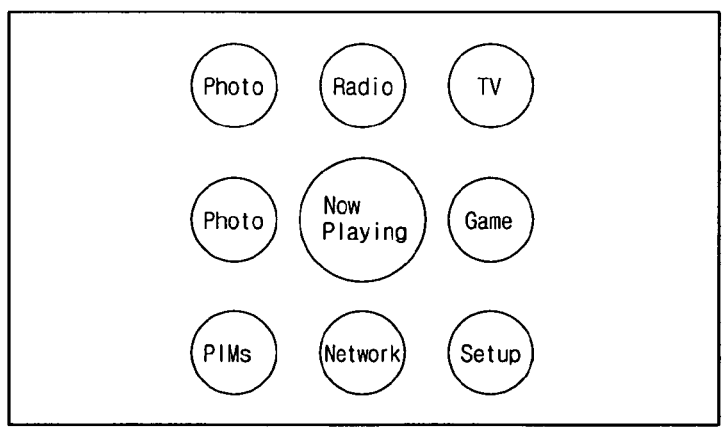
Figure 33C:
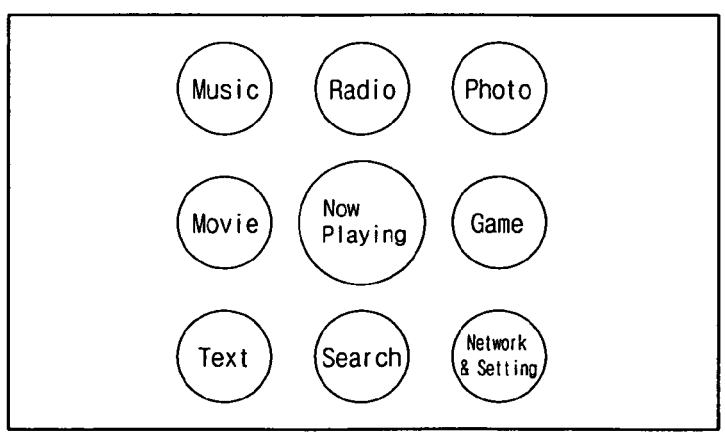

FIGS. 33A through 33C illustrate menus in which item information is written inside circles. The largest circle in each of the menus shown in FIGS. 33A through 33C operates as a pointer. "Now Playing" written in circles positioned in the center as shown in FIGS. 33B and 33C denote user commands that may be input by touching the manipulation button 120 positioned inside the 3-dimensional touch pad 130.

Figure 34A:
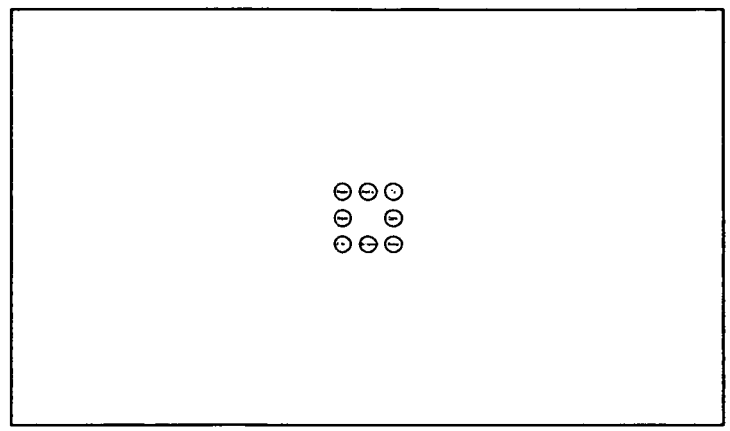
Figure 34B:
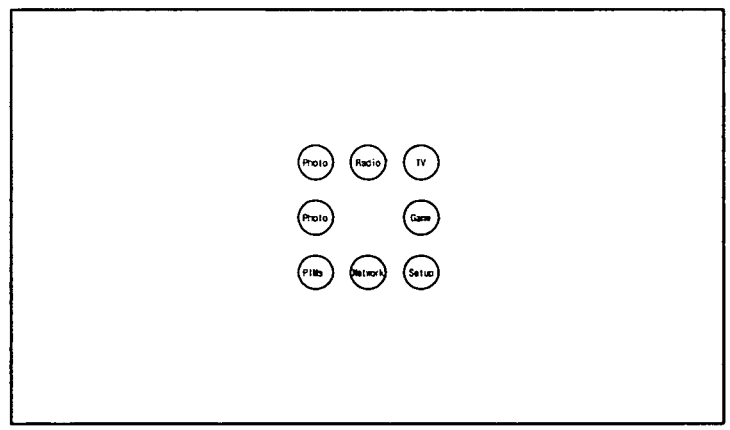
Figure 34C:
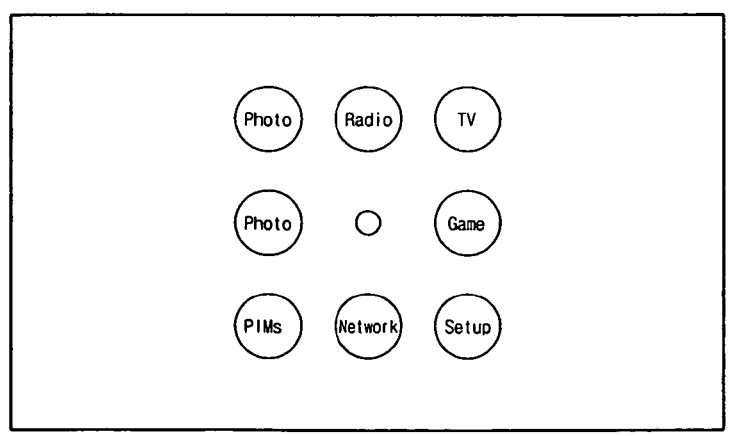

In menus as shown in FIGS. 33A through 33C, circles may become larger as shown in FIGS. 34A through 34C when an electronic device is powered on so as to provide a higher visual effect to a user.

Figure 35A:
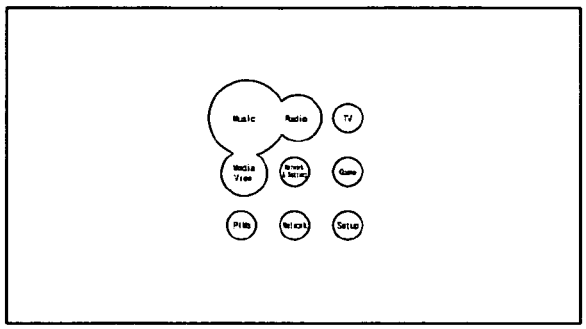
Figure 35B:
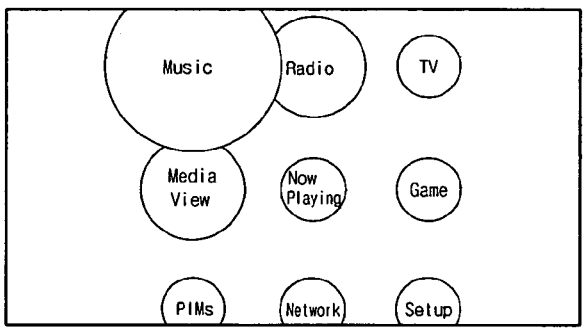
Figure 35C:
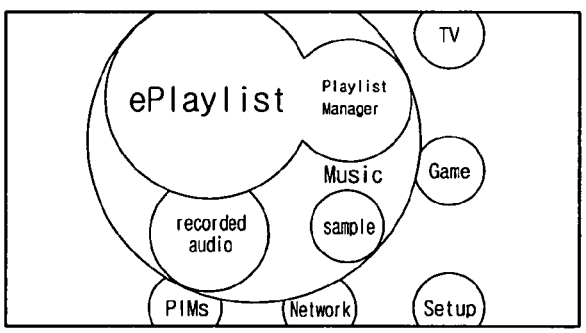
Figure 35D:
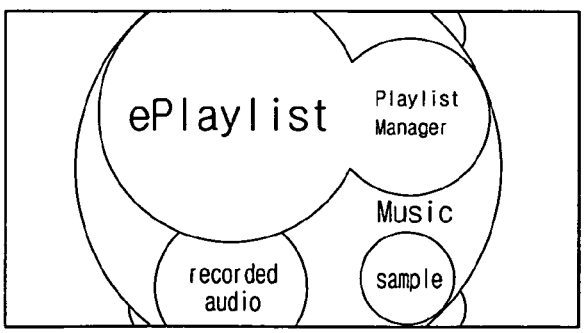

In a case where a 3-dimensional GUI picture displaying menus as shown in FIG. 35A is displayed on the main LCD 280, in-rubbing sensed by the 3-dimensional touch sensor unit 230 may be used to input a user command to display a circular pointer with its slow zooming in and a lower menu of a menu item indicated by the circular pointer inside the circular pointer as shown in FIGS. 35B, 35C, and 35D.

Figure 36A:
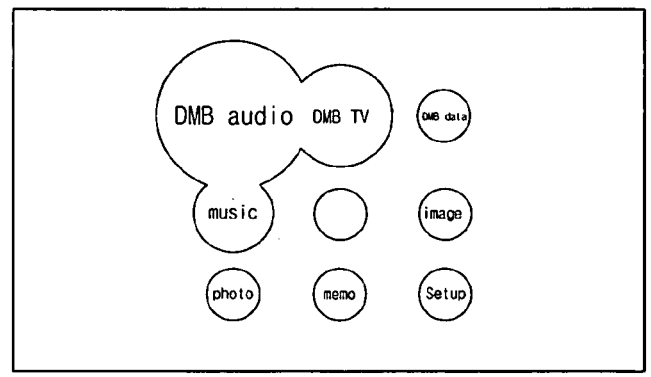
Figure 36B:
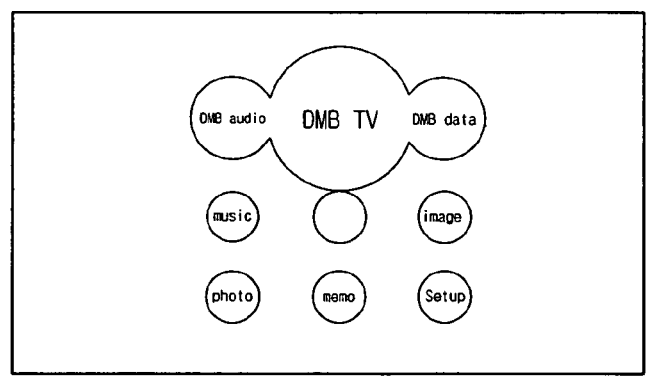
Figure 36C:
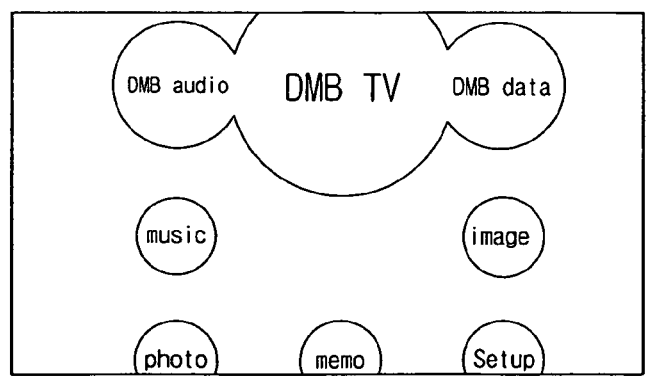
Figure 36D:
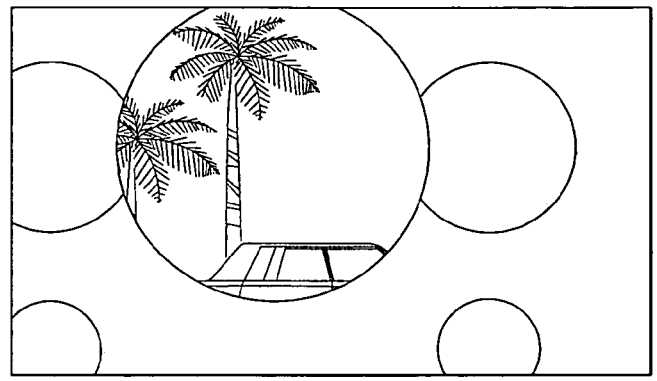
Figure 36E:
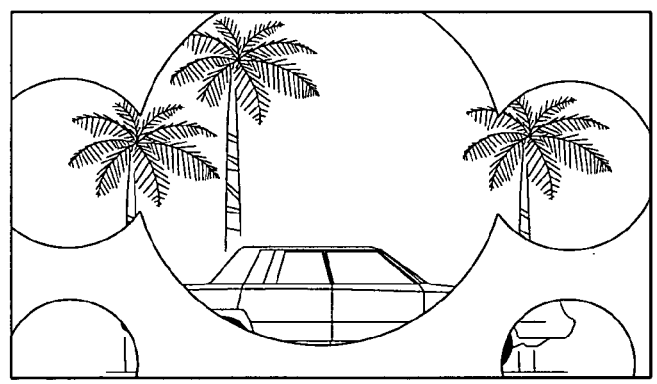
Figure 36F:
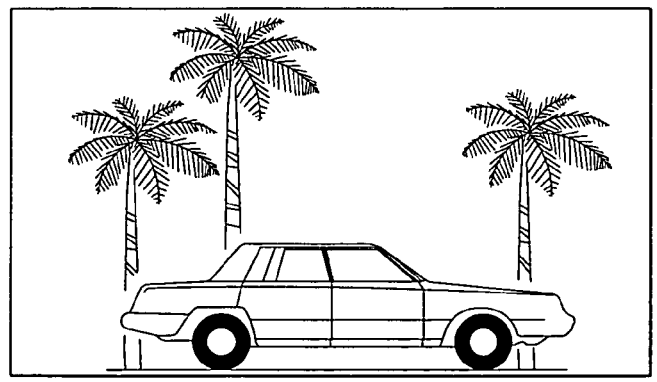

As another example, in a case where a 3-dimensional GUI picture displaying a menu as shown in FIG. 36A is displayed on the main LCD 280, in-rubbing sensed by the 3-dimensional touch sensor unit 230 may be used to input a user command to display a circular pointer with its slow zooming in and an execution picture of a menu item indicated by the circular pointer inside the zooming pointer as shown in FIGS. 36B through 36F.

Figure 37A:
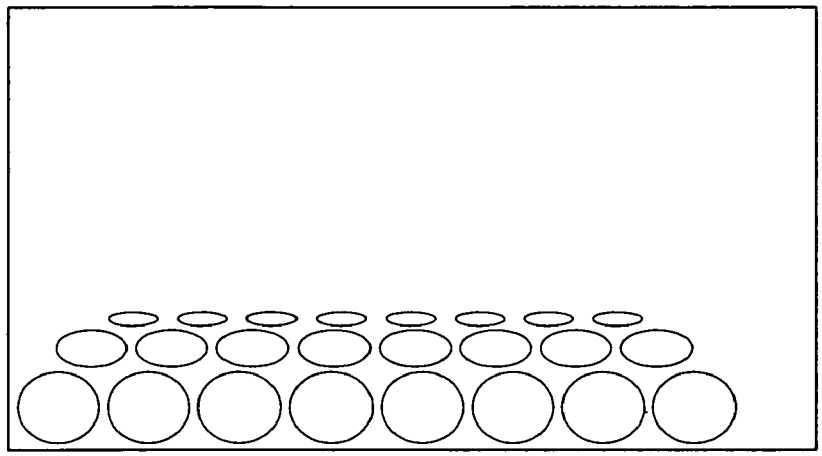
Figure 37B:
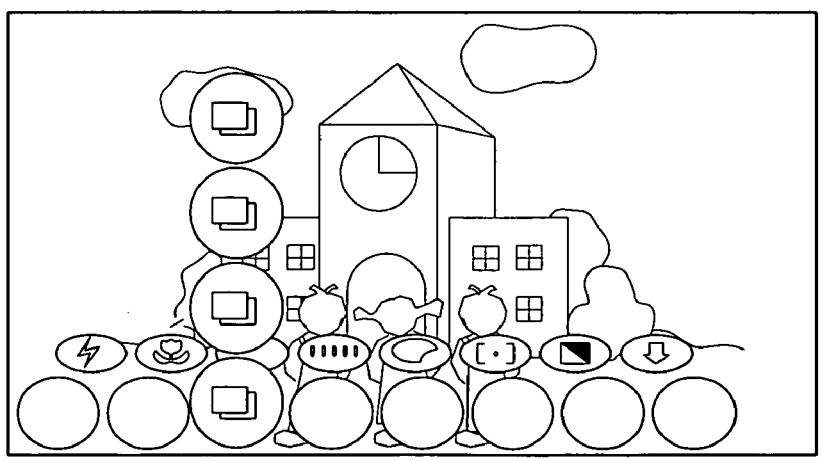

As another example, in a case where a 3-dimensional GUI picture 3-dimensionally displaying different menus is displayed on the main LCD 280 as shown in FIGS. 37A and 37B, in-rubbing sensed by the 3-dimensional touch sensor unit 230 may be used to input a user command to move a closest menu (positioned at the top of the 3-dimensional GUI picture) to a remotest position (a lowest position on the 3-dimensional GUI picture).

Also, out-rubbing may be used to input a user command to move a second closest menu to a closest position. Here, menus may be slowly (sequentially) moved.

Figure 38A:
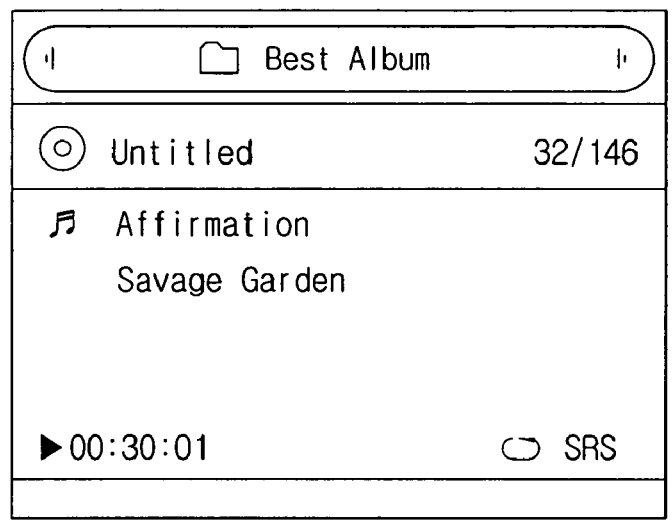
Figure 38B:
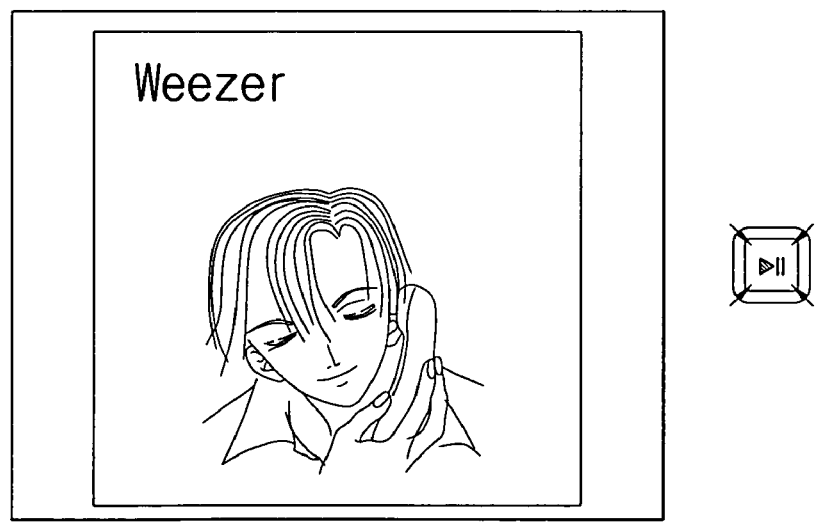
Figure 38C:
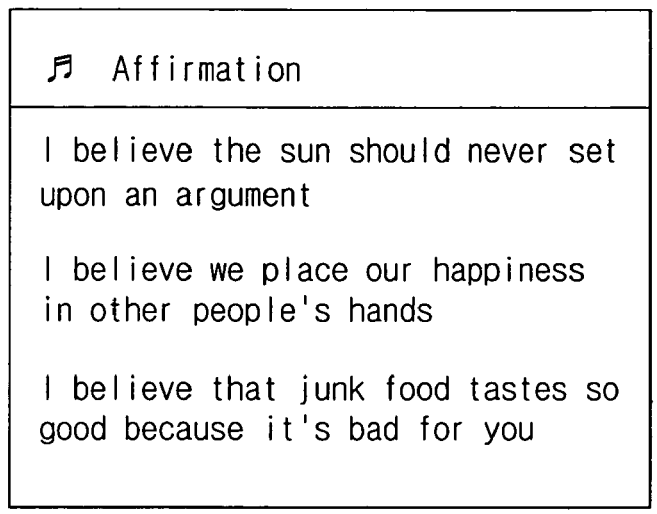

As another example, in a case where a GUI picture displaying a list is displayed on the main LCD 280 as shown in FIG. 38A, in-rubbing sensed by the 3-dimenisonal touch sensor unit 230 may be used to input a user command to call a GUI picture displaying detailed information (album information, lyrics information, and the like) as to a list item indicated by a pointer (cursor) as shown in FIGS. 38B and 38C.

Figure 38D:
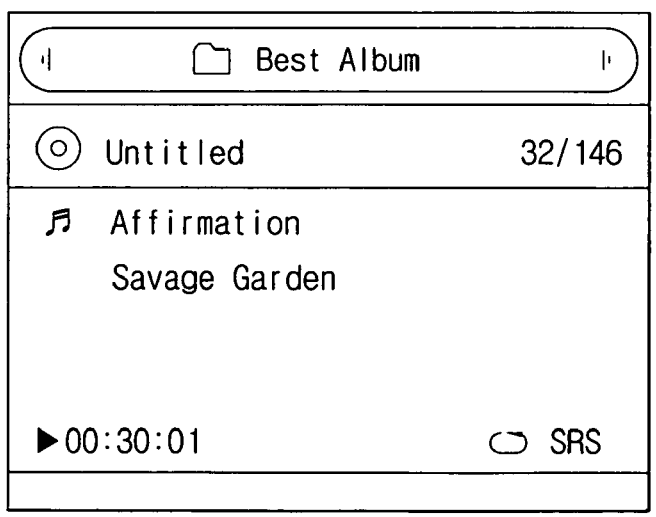

In a case where a GUI picture as shown in FIG. 38B or 38C is displayed on the main LCD 280, out-rubbing sensed by the 3-dimensional touch sensor unit 230 may be used to input a user command to move a pointer to a list including list items of detailed information as shown in FIG. 38D.

Figure 39A:
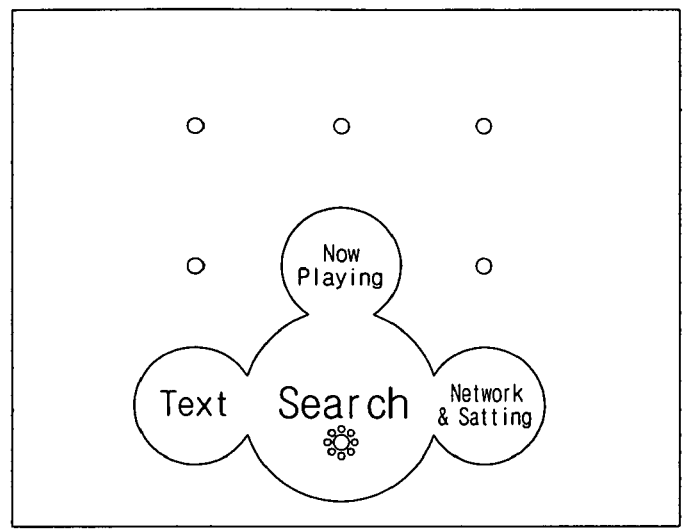
Figure 39B:
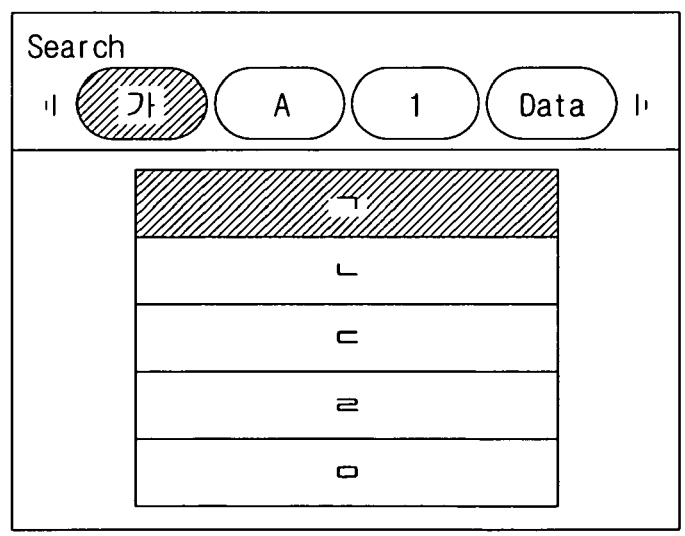
Figure 39C:
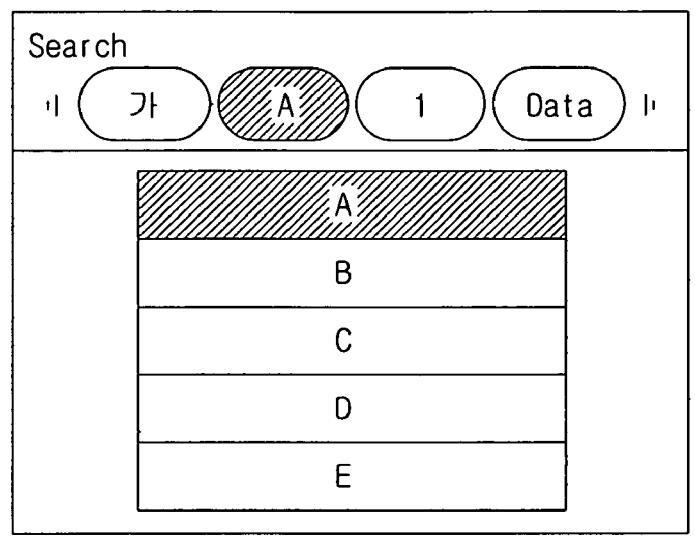

As another example, in a case where a GUI picture displaying Korean alphabet search menus of FIG. 39B called by selecting an item "Search" on a GUI picture shown in FIG. 39A is displayed on the main LCD 280, right-rubbing sensed by the 3-dimensional touch sensor unit 230 may be used to input a user command to call a GUI picture displaying English search menus shown in FIG. 39C.

In a case where the GUI picture displaying the English search menus shown in FIG. 39C is displayed on the main LCD 280, left-rubbing sensed by the 3-dimensional touch sensor unit 230 may be used to input a user command to call the GUI picture displaying the Korean search menus shown in FIG. 39B.

Figure 39D:
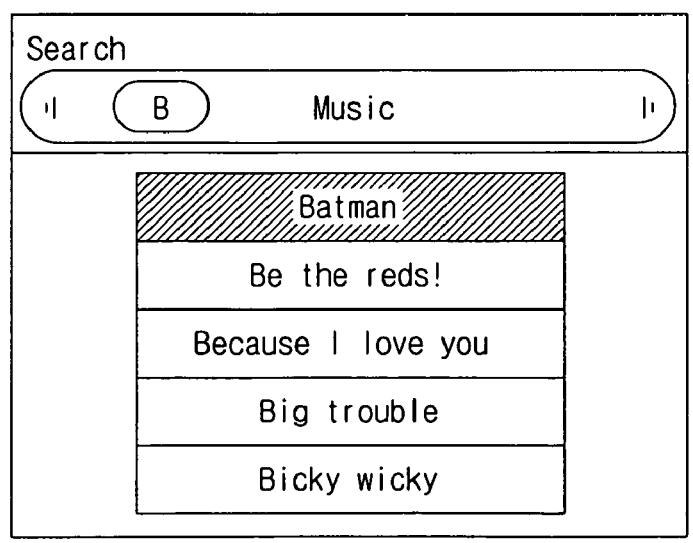
Figure 39E:
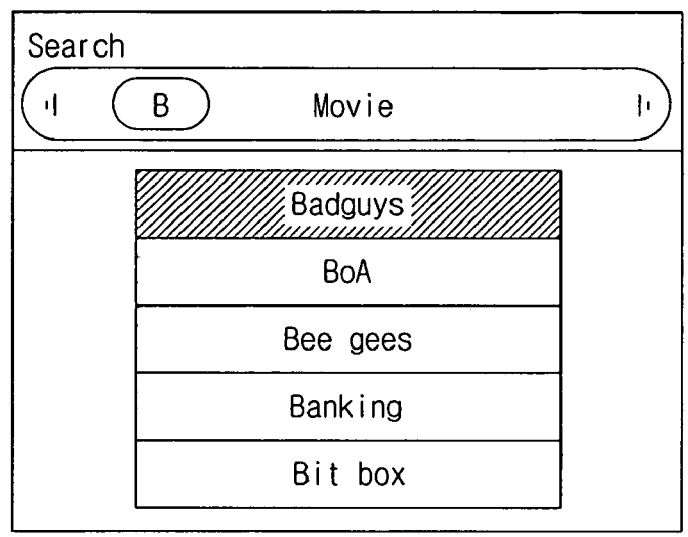

In a case where a GUI picture displaying a list of music files starting with "B" shown in FIG. 39D is displayed on the main LCD 280, right-rubbing sensed by the 3-dimensional touch sensor unit 230 may be used to input a user command to move a pointer to a GUI picture displaying a list of movie files starting with "B" shown in FIG. 39E.

In a case where the GUI picture displaying the list of the movie files starting with "B" shown in FIG. 39E is displayed on the main LCD 280, left-rubbing sensed by the 3-dimensional touch sensor unit 230 may be used to input a user command to move the pointer to the GUI picture displaying the list of the music files starting with "B" shown in FIG. 39D.

Figure 39F:

A selection of a list item from items of the list shown in FIG. 39D may be used to input a user command to execute the list items as shown in FIG. 39F.

Figure 40A:
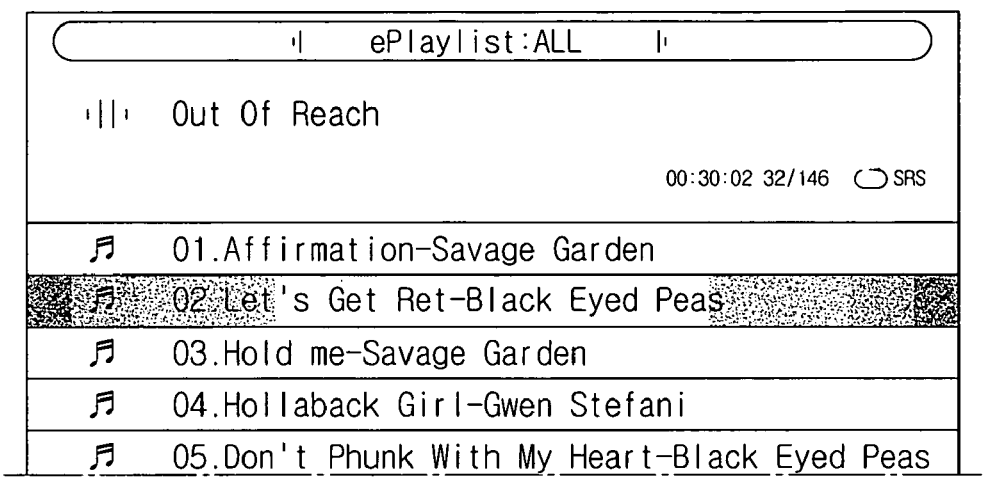
Figure 40B:
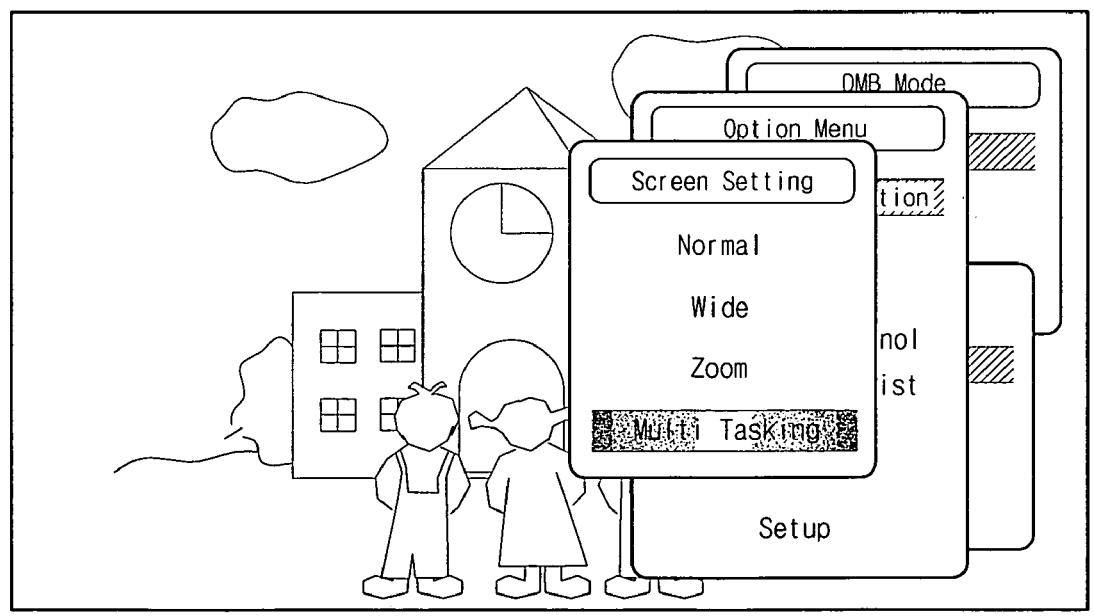

As shown in FIG. 40, a method of displaying a pointer (cursor) on a GUI may be the same as the light emitting method of the 3-dimensional touch pad shown in FIG. 21A. In this case, a user may feel that a PUI is equal to a GUI.

Figure 41:
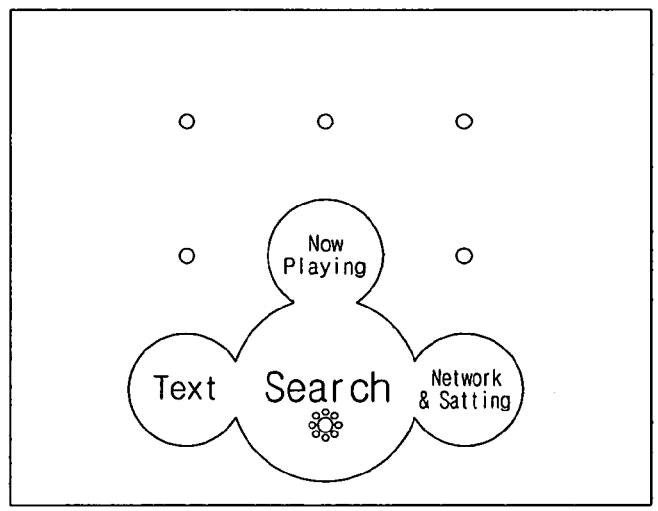

As shown in FIG. 41, a method of adding "*" to an item "Search" indicated by a pointer may also be the same as the light emitting method of the 3-dimensional touch pad.

Figure 42:
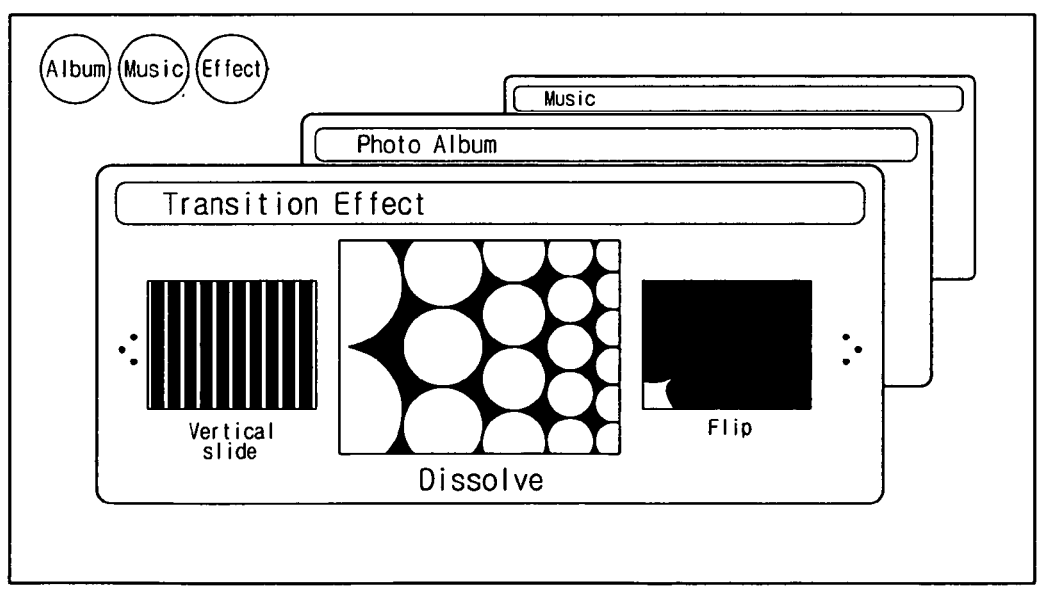

In a case where a selected item is executed to display an image on the main LCD 280, an initial displaying method for the image may vary. A GUI picture displaying a window "Transition Effect" for setting an initial displaying method is shown in FIG. 42. As shown in the window "Transition Effect," the initial displaying method may be a "Vertical Slide" method, a "Dissolve" method, a "Flip" method, or the like.

Figure 43:
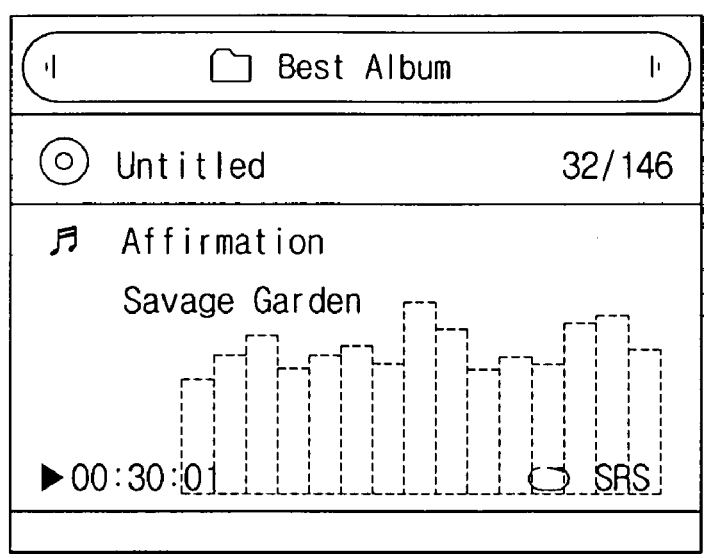

In a case where a music item is executed, an option such as an equalizer or the like may overlap with the music item as shown in FIG. 43.

A method of sensing 3-dimensional rubbing of a user to generate and/or display a 3-dimensionl GUI coinciding with a deciphered user command has been described with detailed examples. The above-described contents may be applied to generate and/or display a 3-dimensional GUI using different methods from the above-described methods. These methods will be understood by those of ordinary skill in the art and thus will not be described in detail herein.

As described above, in an electronic device for 3-dimensionally inputting a user command according to an exemplary embodiment of the present invention, a 3-dimensional varying method of a 3-dimensional GUI can harmonize with a 3-dimensional input manipulation of a user. Thus, the user can further intuitively input the user command through a GUI of the electronic device so as to further easily manipulate the electronic device. Also, the user can feel a solidity during an input manipulation as well as in terms of visual sense so as to further enjoy entertainment during the use of the electronic device.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art. It will be understood by those skilled in the art that various changes in form and details may be made therein without departing from the spirit and scope of the invention as defined by the appended claims and the full scope of equivalents thereof.

What is claimed is:

1. An electronic device comprising:
a touch pad sensing a 3-dimensional interface, the touch pad being either concave-shaped or planar-shaped and embedded in a surface of the electronic device, the touch pad comprising an inner region and outer sensing region surrounding the inner region with the third dimension of the sensed 3-dimensional interface sensed by the outer sensing region according to an inward or outward movement sensed on the outer sensing region;
a controller controlling a GUI (graphical user interface) in response to the 3-dimensional interface sensed by the touch pad; and
a display displaying the GUI;
wherein a sensed direction of the sensed third dimension is determined based on whether the sensed movement is an inward movement or an outward movement;
wherein the 3-dimensional interface is sensed using the touch pad disposed in one side of the electronic device; and
wherein the display and a contour of the touch pad are arranged substantially in a same plane of the surface where the touch pad is embedded.

2. The electronic device of claim 1, wherein the touch pad senses interfaces on a first, a second, and a third axis input by a user, and the controller deciphers the interfaces on the first, second, and third axis sensed by the touch pad as a first, a second, and a third user command, respectively, and controls the GUI based on the deciphered results.

3. The electronic device of claim 2, wherein the first user command is a user command related to a fourth axis direction on a GUI picture, the second user command is a user command related to a fifth axis direction on the GUI picture, and the third user command is a user command related to a sixth axis direction on the GUI picture.

4. The electronic device of claim 2, wherein:
the interface on the first axis is sensed in at least one of an upper area and a lower area of the touch pad;
the interface on the second axis is sensed in at least one of a left area and a right area of the touch pad; and
the interface on the third axis is sensed in at least one of the upper area, lower area, left area, and right area of the touch pad.

5. The electronic device of claim 1, wherein the touch pad comprises an outer part and an inner part forming a slope for sensing a third dimension of the 3-dimensional interface other than a first and a second dimensions of the 3-dimensional interface sensed by at least one of the out part and the inner part of the touchpad.

6. The electronic device of claim 1, wherein the touch pad comprises at least one of a ring shape, a circular shape, a square ring shape, a square shape, a C shape, and an L shape.

7. The electronic device of claim 1, wherein the touch pad senses a point touched by the user, and the controller deciphers a type of a user command based on the touched point sensed by the touch pad.

8. The electronic device of claim 1, comprising a touchable point displaying information as to a user command input through a touch of the touchable point.

9. The electronic device of claim 1, comprising a touchable point displaying information as to a user command input through a touch of the touchable point around the touchable point.

10. The electronic device of claim 1, wherein the display is positioned outside the touchpad and displays visual indication of a user command input through a touch of a touchable point.

11. The electronic device of claim 10, wherein a position of the visual indications of the user command on the display visually corresponds to a position of a touchable point on the touch pad touched to input the user command.

12. The electronic device of claim 1, further comprising an auxiliary display displaying information as to a user command.

13. The electronic device of claim 12, wherein the information as to the user command is displayed at a point on the auxiliary display adjacent to a point on a touch pad touched to input the user command.

14. The electronic device of claim 1, further comprising a manipulation button positioned inside the touch pad and sensing an input of a user,
wherein the controller deciphers the input of the user sensed by the manipulation button as a user command.

15. The electronic device of claim 14, wherein the manipulation button comprises at least one button sensing pressing performed by a user.

16. The electronic device of claim 1, further comprising an auxiliary display positioned inside the touch pad, displaying information as to a user command that can be input, and inputting a user command displayed through a touch.

17. The electronic device of claim 1, further comprising a light emitter including at least one light emitting device provided in the touch pad.

18. The electronic device of claim 17, wherein the controller controls the light emitting device to emit light corresponding to a 3-dimensional interface sensed by the touch pad.

19. The electronic device of claim 18, wherein the controller controls the light emitting device to vary a quantity of light emission in correspondence to a force of a touch of the user.

20. The electronic device of claim 17, wherein the touch pad senses interfaces in a first, a second, and a third direction input by a user, and the controller controls the light emitting device to emit light so that the light moves along the first, second, and third directions of the interfaces sensed by the touch pad.

21. The electronic device of claim 17, wherein the touch pad senses interfaces on a first, a second, and a third axis input by a user, and the controller controls the light emitting device to vary a brightness of light in response to the interfaces on the first, second, and third axes sensed by the touch pad.

22. The electronic device of claim 17, wherein the touch pad senses a point touched by a user, and the controller controls the light emitting device to emit light of at least one touched point sensed by the touch pad and around the at least one touched point.

23. The electronic device of claim 17, wherein the controller controls the light emitting device to emit light corresponding to an operation state of the electronic device.

24. The electronic device of claim 17, wherein the light emitting device displays information indicating areas in which a user is able to input interfaces on a first, a second, and a third axis, in each of the areas.

25. The electronic device of claim 1, wherein the display is positioned outside the touch pad and displays a visual indication of a user command input through a touch of a touchable point,
wherein a color of the visual indication of the user command displayed on the display is equal to a color of a touchable point displayed by the light emitting device.

26. The electronic device of claim 1, wherein the controller controls a size of a displayed image so as to vary the display size of the image in response to the 3-dimensional interface sensed by the touch pad.

27. The electronic device of claim 1, wherein the controller controls a number of images displayed so as to vary the number of images displayed in response to the 3-dimensional interface sensed by the touch pad.

28. The electronic device of claim 1, wherein if a plurality of windows performing different tasks are disposed in a multilayer structure, the controller controls a window to move to another layer so as to display the window on the another layer in response to the 3-dimensional interface sensed by the touch pad.

29. The electronic device of claim 1, wherein the controller controls one of menus of upper and lower layers so as to move a menu from a lower layer to an upper layer in response to the 3-dimensional interface sensed by the touch pad.

30. The electronic device of claim 1, wherein the controller controls an execution picture of a menu item indicated by a pointer so as to display the execution picture inside the pointer in response to the 3-dimensional interface sensed by the touch pad.

31. A UI (user interface) method performed in an electronic device, the electronic device having a display, the method comprising:
sensing a 3-dimensional interface with a touch pad either concave-shaped or planar-shaped and embedded in a surface, the touch pad comprising an inner region and outer sensing region surrounding the inner region with the third dimension of the sensed 3-dimensional interface sensed by the outer sensing region according to an inward or outward movement sensed on the outer region; and
controlling a GUI displayed on the display in response to the sensed 3-dimensional interface;
wherein a sensed direction of the sensed third dimension is determined based on whether the sensed movement is an inward movement or an outward movement;
wherein the sensing comprises sensing the 3-dimensional interface using the touch pad disposed in one side of the electronic device; and
wherein the display and a contour of the touch pad are arranged substantially in a same plane of the surface where the touch pad is embedded.

32. The UI method of claim 31, wherein interfaces on a first, a second, and a third axis input by a user are sensed, the interfaces on the first, second, and third axes are respectively deciphered as a first, a second, and a third user command, and the GUI is controlled based on the deciphered results.

33. The UI method of claim 32, wherein the first user command is a user command related to a fourth axis direction on a GUI picture, the second user command is a user command related to a fifth axis direction on the GUI picture, and the third user command is a user command related to a sixth axis direction on the GUI picture.

34. An electronic device comprising:
an input unit sensing at least one interface in a first, a second, and a third direction, said input unit being either concave-shaped or planar-shaped and embedded in a surface of the electronic device, the input unit comprising an inner region and outer sensing region surrounding the inner region with the third dimension of the sensed 3-dimensional interface sensed by the outer sensing region according to an inward or outward movement sensed on the outer sensing region;
a controller controlling a GUI in response to the interfaces sensed by the input unit; and
a display displaying the GUI;
wherein a sensed direction of the sensed third dimension is determined based on whether the sensed movement is an inward movement or an outward movement;
wherein the 3-dimensional interface is sensed using said input unit disposed in one side of the electronic device; and
wherein the display and a contour of the touch pad are arranged substantially in a same plane of the surface where the touch pad is embedded.

35. A UI method performed in an electronic device, the electronic device having a display, the UI method comprising:
sensing at least one of an interface in a first, a second, and a third direction with a touch pad either concave-shaped or planar-shaped and embedded in a surface, the touch pad comprising an inner region and outer sensing region surrounding the inner region with the third dimension of the sensed 3-dimensional interface sensed by the outer sensing region according to an inward or outward movement sensed on the outer sensing region; and
controlling a GUI displayed on the display in response to the sensed interfaces;
wherein a sensed direction of the sensed third dimension is determined based on whether the sensed movement is an inward movement or an outward movement;
wherein the sensing comprises sensing the 3-dimensional interface using the touch pad disposed in one side of the electronic device;
wherein the display and a contour of the touch pad are arranged substantially in a same plane of the surface where the touch pad is embedded.

36. An electronic device comprising:
an input unit sensing a 3-dimensional interface, said input unit being either concave-shaped or planar-shaped and embedded in a surface of the electronic device, the input unit comprising an inner region and outer sensing region surrounding the inner region with the third dimension of the sensed 3-dimensional interface sensed by the outer sensing region according to an inward or outward movement sensed on the outer sensing region;

a display displaying a GUI;
a controller controlling contents displayed on the display in response to the 3-dimensional interface sensed by the input unit;
wherein a sensed direction of the sensed third dimension is determined based on whether the sensed movement is an inward movement or an outward movement;
wherein the 3-dimensional interface is sensed using said input unit disposed in one side of the electronic device; and
wherein the display and a contour of the touch pad are arranged substantially in a same plane of the surface where the touch pad is embedded.

37. A UI method performed in an electronic device, the electronic device having a display, the UI method comprising:
sensing a 3-dimensional interface with a touch pad either concave-shaped or planar-shaped and embedded in a surface, the touch pad comprising an inner region and outer sensing region surrounding the inner region with the third dimension of the sensed 3-dimensional interface sensed by the outer sensing region according to an inward or outward movement sensed on the outer sensing region; and
controlling contents displayed on the display in response to the sensed 3-dimensional interface;
wherein a sensed direction of the sensed third dimension is determined based on whether the sensed movement is an inward movement or an outward movement;
wherein the sensing comprises sensing the 3-dimensional interface using the touch pad disposed in one side of the electronic device; and
wherein the display and a contour of the touch pad are arranged substantially in a same plane of the surface where the touch pad is embedded.

38. An input unit comprising:
a touch pad sensing a 3-dimensional interface input by a user, said touch pad being either concave-shaped or planar-shaped and embedded in a surface of the input unit, the touch pad unit comprising an inner region and outer sensing region surrounding the inner region with the third dimension of the sensed 3-dimensional interface sensed by the outer sensing region according to an inward or outward movement sensed on the outer sensing region;
wherein the 3-dimensional interface sensed by the touch pad is transmitted to a device controlling an electronic device having a display such that contents displayed on the display are controlled in response to the sensed 3-dimensional interface;
wherein a sensed direction of the sensed third dimension is determined based on whether the sensed movement is an inward movement or an outward movement;
wherein the 3-dimensional interface is sensed using said touch pad disposed in one side of the electronic device; and
wherein the display and a contour of the touch pad are arranged substantially in a same plane of the surface where the touch pad is embedded.

39. An electronic device comprising:
a pointer device embedded only in a single surface of the electronic device, the pointer device comprising an inner region and outer region surrounding the inner region;
a controller configured to:
receive user touch input indicating movement on the inner region or the outer region;
in response to an indication of movement along a first axis or a second axis on the outer region, control a GUI (graphical user interface) to navigate data on a display unit of the electronic device; and
in response to an indication of movement from the inner region to outer region or from the outer region to inner region, respectively perform a zoom-in or zoom-out function for an image on the display unit with respect to a third axis.

40. An electronic device comprising:
a touch pad disposed on a surface of the electronic device, the touch pad comprising a first region and second region encompassing at least a portion of the first region;
a processor configured to:
receive user input indicating movement on the first or second region;
in response to an indication of movement along a first axis or a second axis on the second region, control a GUI (graphical user interface) to navigate data on a display unit of the electronic device; and
in response to an indication of movement from the first region to second region or from the second region to first region, respectively perform a zoom-in or zoom-out function for an image on the display unit with respect to a third axis.

41. The device of claim 39, wherein the first axis direction, second axis direction and third axis direction are respectively a x-axis, y-axis and z-axis direction.

42. The device of claim 40, wherein the first axis direction, second axis direction and third axis direction are respectively a x-axis, y-axis and z-axis direction.

43. The device of claim 40, wherein the zoom-in function can expand the image along the third axis to increase at least a portion of the image and the zoom-out function can compress the image along the third axis to decrease at least a portion of the image.

44. The device of claim 40, wherein the first axis is a vertical axis and the second axis is a horizontal axis.

45. The device of claim 39, wherein a zoom factor can be changed based on the movement in one dimension in a first direction moving from the outer region to the inner region or in a second direction moving from the inner region to the outer region.

46. The device of claim 45, wherein the zoom factor can be increased so as to perform a zoom-in function responsive to an indication of movement in the first direction, and the zoom factor can be decreased so as to perform a zoom-out function responsive to an indication of movement in the second direction.

47. The device of claim 45, wherein the zoom factor can be decreased so as to perform a zoom-out function responsive to an indication of movement in the first direction, and the zoom factor can be increased so as to perform a zoom-in function responsive to an indication of movement in the second direction.

48. The device of claim 39, wherein the first axis is disposed substantially perpendicular to the second axis.

49. The device of claim 48, wherein the third axis is orthogonal to both the first and second axes.

50. The device of claim 39, wherein the first axis is a vertical axis and the second axis is a horizontal axis.

* * * * *